(12) United States Patent
Lu et al.

(10) Patent No.: US 9,253,106 B2
(45) Date of Patent: Feb. 2, 2016

(54) TRAFFIC-CONTROL-BASED DATA TRANSMISSION METHOD AND COMMUNICATION SYSTEM

(75) Inventors: Dorian Lu, Shanghai (CN); Carl Yang, Beijing (CN)

(73) Assignee: BEIJING QIANTANG NETWORK TECHNOLOGY COMPANY, LTD., Beijing (CN)

( * ) Notice: Subject to any disclaimer, the term of this patent is extended or adjusted under 35 U.S.C. 154(b) by 274 days.

(21) Appl. No.: 13/814,715

(22) PCT Filed: Aug. 4, 2011

(86) PCT No.: PCT/CN2011/077996
§ 371 (c)(1),
(2), (4) Date: Apr. 11, 2013

(87) PCT Pub. No.: WO2012/061532
PCT Pub. Date: Feb. 9, 2012

(65) Prior Publication Data
US 2013/0208592 A1    Aug. 15, 2013

(30) Foreign Application Priority Data

Aug. 6, 2010  (CN) .......................... 2010 1 0248191

(51) Int. Cl.
*H04L 12/26* (2006.01)
*H04L 12/835* (2013.01)
*H04L 12/801* (2013.01)
*H04L 29/06* (2006.01)

(52) U.S. Cl.
CPC ................ *H04L 47/30* (2013.01); *H04L 47/10* (2013.01); *H04L 69/161* (2013.01)

(58) Field of Classification Search
None
See application file for complete search history.

(56) References Cited

U.S. PATENT DOCUMENTS

| RE43,704 | E | * | 10/2012 | Gupta et al. | ................... | 370/254 |
| 8,537,661 | B2 | * | 9/2013 | Yoshimura | .......... | H04L 12/6402 |
| | | | | | | 370/219 |

(Continued)

FOREIGN PATENT DOCUMENTS

| CN | 1937587 | A | 3/2007 |
| CN | 101005453 | A | 7/2007 |
| CN | 101567855 | A | 10/2009 |
| CN | 100561985 | C | 11/2009 |
| CN | 101917492 | A | 12/2010 |
| JP | 2004080207 | A | 3/2004 |

OTHER PUBLICATIONS

Office Action of the counterpart Chinese application 2010102481915.

(Continued)

*Primary Examiner* — Steve Young
(74) *Attorney, Agent, or Firm* — Kilpatrick Townsend & Stockton LLP

(57) ABSTRACT

The present invention discloses a traffic control-based data transmission method, a traffic control-based switch, a node server and a traffic control-based communication system, thereby solving the problem that the quality of network transmission cannot be guaranteed in the present IP network. The method comprises: obtaining, by a switch, the traffic control information for each service request, wherein the traffic control information includes sending time interval and sending data size; receiving, by the switch, a data packet, and putting it into a packet buffer queue; and polling, by the switch, the packet buffer queue, and taking a packet from the packet buffer queue for sending according to the traffic control information. The present invention can realize accurate traffic control, it is applicable for multimedia transmission, and it can guarantee transmission quality.

10 Claims, 4 Drawing Sheets

(56) References Cited

U.S. PATENT DOCUMENTS

| | | |
|---|---|---|
| 2002/0163915 A1 | 11/2002 | Wallner et al. |
| 2003/0081607 A1* | 5/2003 | Kavanagh .................... 370/392 |
| 2003/0202513 A1* | 10/2003 | Chen et al. .................... 370/390 |
| 2004/0141501 A1* | 7/2004 | Adams et al. ................. 370/389 |
| 2006/0203728 A1* | 9/2006 | Kwan et al. ................... 370/235 |
| 2008/0008202 A1* | 1/2008 | Terrell et al. ................. 370/401 |

OTHER PUBLICATIONS

Yuanfeng Liu, "Research and Implement of Network Traffic Shaping Based on Leak Bucket Method and Token Bucket Algorithm", a Chinese thesis published Oct. 16-Nov. 15, 2008, 37 pages.

International Search Report mailed Oct. 27, 2011, PCT Application No. PCT/CN2011/077996, 4 pages.

* cited by examiner

TRAFFIC-CONTROL-BASED DATA TRANSMISSION METHOD AND COMMUNICATION SYSTEM

This application is a U.S. National Stage of International Application No. PCT/CN2011077996, filed on Aug. 4, 2011, which claims priority to Chinese Application No. 201010248191.5, filed on Aug. 6, 2010, all of which are incorporated herein by reference in their entireties.

FIELD

The present invention relates to the technical field of communication technologies, and in particular, to a traffic control-based data transmission method, a traffic control-based switch, a node server and a traffic control-based communication system.

BACKGROUND

Communication Networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd; or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology; except for IP, has such a large potentiality and development space. (Abstracted from IP *Convergence: Building the Future*, by Susan Breidenhach, *Network World*, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in e-mail sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type". Such a feature is very important, and iii the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to er transmission; so long as there exists a TCP retransmission mechanism, a computer may consider the network as usable even if a great part of data packets are lost during the transmission process. However, if packet, loss rate and error code rate are higher than 1/1,000, the quality of video and audio will be lowered for synchronous video. Empirical data tells us that high-quality video communication even quires that packet loss and error code should be lower than 1/100,000. Test data from the current network environment show that most packet loss occurs inside a router, and error codes generated during optical fiber transmission may almost be neglected.

Why can't "Inte Serv" Succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centratizedly, a problem will arise and periodic burst traffic will be formed. Because the core concept of IP Internet is "Best Efforts", at each network node, the switch always tries its best to forward data at the highest speed. After a video stream passes multiple levels of switches, it will be certain that traffic distribution becomes non-uniform. When multiple non-uniform and asynchronous streams are combined, greater non-uniformity will be generated in a period of time; that is, periodic congestion of network traffic is certain to appear. With the increasing of video user numbers, no upper limit can be given to periodic congestion, and when it exceeds the internal storage capacity of the switch, packet loss will be directly caused.

Why does "Diff Serv" Fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the stream of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection network management is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized large-scale public networks.

Why can't "Light Load" Succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is traffic non-uniformity. Macroscopically, when the sending speed is high in one time period, it is certain to cause jam in another time period; no upper limit can be given to the peak traffic of the network so long as the network traffic is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous traffic will be tens of folds of that of HDTV, because most of the current web site servers use a Gigabit network interface. If the traffics of a lot of similar web sites just collide, the burst traffic generated in a certain short fine will exceed the traffic required by all network-wide users that use HDTV, and a network with any bandwidth can be occupied. As shown by statistical analysis, such a collision is frequent.

IP Internet tries to absorb the instantaneous traffic by employing a memory, which causes the increase of transmission delay. The storage capacity is limited, but the burst traffic has no upper limit; therefore, by employing the memory method, it can only improve the packet loss of the current device, and the burst traffic absorbed at the current node will put much pressure on the next node. Video stream traffic is ceaseless, and the storage mode of the switch intensifies the accumulation of the burst traffic to a weak node, thus network packet loss is inevitable.

By employing light load plus "Diff Serv" technology, the current network constructors may deal with narrowband VoIP voice services. This is because voice does not occupy the main part of total traffic on the network; once jam occurs, voice will take priority by sacrificing computer files. However, for high-bandwidth video communication, only temporary improvement can be obtained by partial expansion. If expansion is also carried out at other nodes, the non-uniformity of network traffic will increase therewith, so that the effect of the originally expanded part will be lowered. If expansion is carried uniformly network wide, the transmission quality will return to that before expansion. In other words, overall expansion is ineffective.

At present, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY

The technical problem to be solved by the invention is to provide a traffic control-based data transmission method, a traffic control-based switch, a node server and a traffic control-based communication system, thereby solving the problem that the quality of network transmission cannot be guaranteed in the present IP network.

In order to solve the above problem, the invention discloses a traffic control-based data transmission method, comprising: obtaining, by a switch, the traffic control information for each service request, wherein the traffic control information includes sending time interval and sending data size; receiving, by the switch, a data packet, and putting it into a packet buffer queue; and polling, by the switch, the packet buffer queue, and taking a packet from the packet buffer queue for sending according to the traffic control information.

Wherein, the sending data size in the traffic control information includes a maximum value of byte that can be sent and a parameter for adjusting the sending of a packet with a variable packet length.

The method may perform traffic control on both uplink and downlink; but preferably, it only needs to perform traffic control on the uplink, thus the data packet is an uplink data packet.

The method is specifically realized as follows:

1) After receiving a data packet and before storing it in a packet buffer queue, the method further comprises: checking the data packet received, and allocating a corresponding stream identifier and putting it into a corresponding port receive buffer if the data packet meets a check requirement; then, the putting the data packet into a packet buffer queue is: reading the data packet from the port receive buffer, and putting the data packet into a packet buffer queue of the corresponding stream according to the stream identifier. Wherein, it may check whether the destination address, the source address, the data packet type and the packet length of the data packet meet a requirement.

Wherein, the check requirement may be obtained from the node server, thus the method further comprises: a node server with a centralized control function in the novel network generates a check requirement for the service according to a service request protocol packet initiated by a terminal; the node server sends the check requirement for the service to a switch for traffic control on the uplink.

2) After obtaining the traffic control information in real time, the method further comprises: generating a sending token according to the traffic control information, wherein the token contains a stream identifier. Then, the taking a packet from the packet buffer queue for sending according to the traffic control information comprises: sequentially reading a data packet from the packet buffer queue of the corresponding stream according to the stream identifier in the sending token, and putting the data packet into a port send buffer; and reading the data packet from the port send buffer and sending the data packet. In addition, the method may further comprise: determining whether the following two conditions are met: 1) the port send buffer is not full; 2) the count of a packet counter in the packet buffer queue of the corresponding stream is larger than 0; when the two conditions are met, it sequentially reads the data packet from the packet buffer queue of the corresponding stream according to the stream identifier in the sending token, and puts the data packet into the port send buffer.

For each service request, the switch obtains the traffic control information in the following modes: generating, by a node server with a centralized control function in the novel network, a traffic control information according to a service request protocol packet initiated by a terminal; and sending, by the node server, the traffic control information for the service to a switch for traffic control on the uplink.

Each switch on the novel network may perform traffic control, but preferably, the switch for traffic control is the first switch of an access terminal.

The node server has a centralized control function, and it generates traffic control information in the following modes:

maintaining, by the node server, an address information table, in which novel network address occupation information, device description information and device resource description information are recorded, wherein the device resource description information includes a novel network address of an access network device connected to respective network port of the device and an uplink and downlink traffic count on each network port of the device; obtaining, by the node server, the uplink and downlink corresponding to the service according to the novel network address of an access network device connected to respective network port of the device in the address information table; and obtaining the remaining traffic resources on the uplink and downlink for the service according to the uplink and downlink traffic count on each network port of the device. According to the address information table, the node server checks whether the remaining traffic resources on the uplink and downlink for the service both meet the traffic resources required by the service, if Yes, it generates a traffic control information corresponding to the service; otherwise, it rejects the service request.

Wherein, the maintaining of the address information table comprises:

1) initializing the address information table when the node server is powered on, wherein the initialization operation comprises: filling the novel network address of the node server in a blank item of the address information table, and marking the address occupation information as used; filling the device description information as the current node server; and filling the device resource description information as port information of the current node server.

2) updating the address information table according to the setting of a downlink port to which each downlink protocol packet is to be oriented in an internal downlink protocol packet address table of the node server, wherein the update operation comprises: filling an access network address to be allocated in each downlink protocol packet respectively into a blank item of the address information table, and marking the address occupation information as standby.

3) updating the address information table according to the setting of a downlink port of other access devices to which a port downlink protocol packet is to be oriented, wherein the update operation comprises: filling an access network address to be allocated in each port downlink protocol packet respectively into a blank item of the address information table, and marking the address occupation information as standby.

4) updating the address information table when the node server receives a network access command response sent by a switch, wherein the update operation comprises: marking the address occupation information in an item corresponding to the novel network address of the switch as used; updating the device description information as the current switch; and updating the device resource description information as the port information of the current switch and the novel network address information of an access network device connected to a port thereof.

5) updating the address information table when the node server receives a network access command response sent by a terminal, wherein the update operation comprises: marking the address occupation information in an item corresponding to a novel network address of the terminal as used; updating the device description information as the current terminal; and updating the device resource description information as the port information of the current terminal and a novel network address of an access network device connected to a port thereof.

The centralized control function of the node server is further embodied as follows:

if the remaining traffic resources on the uplink and downlink for the service both meet the traffic resources required by the service, the node server sends transmission path configuration information to all switches on the uplink and downlink, and all the switches set their respective data packet address tables according to the configuration information.

Specially, when there exist a plurality of uplinks or downlinks for the service and if the remaining traffic resource of one uplink or downlink thereof does not meet the traffic resource required by the service, the node server continues to check whether the remaining traffic resource on other uplinks or downlinks meet the traffic resource required by the service, if Yes, it generates a traffic control information corresponding to the service and sends a transmission path configuration information to all switches on the uplink and downlink, and all the switches set their respective data packet address tables according to the configuration information. Correspondingly, if the node server obtains a plurality of uplinks or downlinks that meet the service, it selects one therefrom according to a preset rule. The preset rule is as follows: the node server acquires the traffic information of each link and the traffic information of the current service, and a communication link with the minimum traffic used is determined as the communication link of the current service. Or, the preset rule is as follows: the node server acquires the bandwidth information of each link and the bandwidth information of the current service, and determines a link with the maximum bandwidth as the communication link of the current service.

The use of the data packet address table is as follows: after receiving a data packet and before storing it in a packet buffer queue, the method further comprises: querying a data packet address table, and obtaining the transmission orientation information of a data packet; then, the taking a packet from the packet buffer queue for sending is: sending according to the transmission orientation information of the data packet.

The switch can not only perform an accurate traffic control on a data packet, but also perform an accurate traffic control on a protocol packet, specifically: receiving, by a switch for traffic control, a service request protocol packet, and checking the destination address, source address, data packet type and packet length of the service request protocol packet, if a check requirement is met, the service request protocol packet is put into a corresponding port receive buffer; reading a protocol packet from the port receive buffer, and putting the protocol packet into a corresponding packet buffer queue; and polling the packet buffer queue, if the port send buffer is not full and the count of a packet counter in the packet buffer queue is larger than 0, it sequentially reads a protocol packet from the packet buffer queue at a predefined time interval and puts the protocol packet into a port send buffer; and reading a protocol packet from the port send buffer and sending the protocol packet.

In the above method, the data packet address table includes a unitcast data packet address table and a multicast data packet address table, for orienting a unitcast data packet and a multicast data packet respectively.

The invention further provides a traffic control-based switch, which comprises:

a CPU module, for obtaining a traffic control information for each service request, wherein the traffic control information includes sending time interval and sending data size;

a packet buffer, for storing a data packet;

a first network interface, for receiving a data packet;

a second network interface, for sending a data packet;

a switching engine, for putting a data packet received by the first network interface into a packet buffer queue, polling the packet buffer queue, and taking a packet from the packet buffer queue according to the traffic control information and sending the packet via the second network interface.

The switch may perforin traffic control on both uplink and downlink, but preferably, it only needs to control the uplink. Thus, if the data packet is an uplink data packet, the first network interface will be a downlink network interface, and the second network interface will be an uplink network interface. Wherein, the first network interface and the second network interface respectively comprise at least one port, and each port is configured with a port receive buffer and a port send buffer, respectively for storing a data packet received and a data packet to be sent.

For realizing accurate traffic control, the switch further comprises:

a packet checking module, for checking a data packet received, if the data packet meets a check requirement, it allocates a corresponding stream identifier and puts the data packet into a corresponding port receive buffer on the first network interface; then, the switching engine reads a data packet from the port receive buffer on the first network interface, and puts the data packet into a packet buffer queue of the corresponding stream according to the stream identifier. Wherein, the packet checking module is configured to check whether the destination address, the source address, the data packet type and the packet length of the data packet meet a requirement. Moreover, the packet checking module obtains a check requirement for the current service from a node server with a centralized control function in the novel network.

The switch further comprises: a code rate control module, which is configured by a CPU module, for generating a sending token according to the traffic control information and sending the sending token to the switching engine, wherein the token contains a stream identifier. The switching engine obtains a sending token from the code rate control module, sequentially reads a data packet from the packet buffer queue of the corresponding stream according to the stream identifier in the sending token, and puts the data packet into a port send buffer on the second network interface; the second network interface reads the data packet from the port send buffer and sends the data packet. In addition, the switching engine is further configured to determine whether the following two conditions are met: 1) the port send buffer on the second network interface is not full; 2) the count of a packet counter in the packet buffer queue of the corresponding stream is larger than 0; when the two conditions are met, it sequentially reads a data packet from the packet buffer queue of the corresponding stream according to the stream identifier in the sending token, and puts the data packet into a port send buffer on the second network interface.

Preferably, the sending data size in the traffic control information includes a maximum value of byte that can be sent and a parameter fir adjusting the sending of a packet with a variable packet length.

Preferably, for realizing accurate traffic control, the CPU module obtains the traffic control information for each service from the node server with a centralized control function in the novel network. The switch is the first switch of an access terminal.

Correspondingly, the CPU module is further configured to obtain the transmission path configuration information for each service from the node server, and sets a data packet address table according to the transmission path configuration information. The switching engine is further configured to query a data packet address table, and obtain the transmission orientation information of a data packet; then, the second network interface sends a data packet according to the transmission orientation information of the data packet.

In addition, the switch may further performs traffic control on a protocol packet, as follows:

the first network interface is further configured to receive a service request protocol packet;

the packet checking module is further configured to check the destination address, source address, data packet type and packet length of the service request protocol packet, if the data packet meets a check requirement, it puts the data packet into a corresponding port receive buffer on the first network interface;

the switching engine is further configured to read a service request protocol packet from a port receive buffer on the first network interface and put the service request protocol packet into a corresponding packet buffer queue, and poll the packet buffer queue, if the port send buffer on the second network interface is not full and the count of a packet counter in the packet buffer queue is larger than 0, it sequentially reads a service request protocol packet from the packet buffer queue at a predefined time interval and puts the service request protocol packet into a port send buffer on the second network interface;

the second network interface is further configured to read a service request protocol packet from the port send buffer and sending the service request protocol packet.

In the invention, the data packet address table includes a unitcast data packet address table and a multicast data packet address table, for orienting a unitcast data packet and a multicast data packet respectively.

The invention further provides a traffic control-based node server, which comprises:

a traffic control information generating module, for generating a traffic control information for each service request, wherein the traffic control information includes sending time interval and sending data size; and a traffic control information sending module, for sending the traffic control information for the service to a switch for traffic control.

The node server has a centralized control function, which is embodied as follows:

the node server further comprises: an address information table, for recording novel network address occupation information, device description information and device resource description information, wherein the device resource description information includes a novel network address of an access network device connected to respective network port of the device and an uplink and downlink traffic count on each network port of the device.

the node server further comprises: a transmission path acquiring module, for looking up the novel network address of an access network device connected to respective network port of the device in the address information table according to a service request protocol packet initiated by a terminal, and obtaining an uplink and a downlink corresponding to the service.

the node server further comprises: a traffic calculating module, for obtaining the remaining traffic resources on the uplink and downlink for the service according to the uplink and downlink traffic count on each network port of the device in the address information table.

the node server further comprises: a traffic control module, for checking whether the remaining traffic resources on the uplink and downlink for the service both meet the traffic resources required by the service, if Yes, it triggers the traffic control information generating module to generate a traffic control information corresponding to the service; otherwise, it rejects the service request.

the node server further comprises: a path notifying module, for sending a transmission path configuration information to all switches on the uplink and downlink when the remaining traffic resources on the uplink and downlink for the service both meet the traffic resources required by the service, wherein the transmission path configuration information is used by the switches to set their respective data packet address tables.

the node server further comprises: a path configuring module, for, when there exist a plurality of uplinks or downlinks for the service and if the remaining traffic resource of one uplink or downlink thereof does not meet the traffic resource required by the service, triggering the traffic control module to continue to check whether the remaining traffic resource on other uplinks or downlinks meet the traffic resource required by the service, if Yes, it triggers the traffic control information generating module to generate a traffic control information corresponding to the service, and triggers the path notifying module to send a transmission path configuration information to all switches on the uplink and downlink. If there exist a plurality of uplinks or downlinks that meet the service, the path configuring module selects one therefrom according to a preset rule. Wherein, the preset rule is as follows: a link with the minimum traffic used is determined as the communication link of the current service. Or, the preset rule is as follows: a link with the maximum bandwidth is determined as the communication link of the current service.

A preferred realization mode is as follows: the traffic control information sending module sends the traffic control information for the service to a switch for traffic control on the uplink. The switch for traffic control is the first switch of an access terminal. The sending data size in the traffic control information includes a maximum value of byte that can be sent and a parameter for adjusting the sending of a packet with a variable packet length.

For maintaining the address information table, the node server further comprises:

an address information table initializing module, for initializing the address information table when the node server is powered on, wherein the initialization operation comprises: filling the novel network address of the node server in a blank item of the address information table, and marking the address occupation information as used; and filling the device description information as the current node server; filling the device resource description information as port information of the current node server; and an address information table updating module, for updating the address information table according to the setting of a downlink port to which each downlink protocol packet is to be oriented in an internal downlink protocol packet address table of the node server, wherein the update operation comprises: filling an access network address to be allocated in each downlink protocol packet respectively into a blank item of the address information table, and marking the address occupation information as standby.

The address information table updating module is further configured to update the address information table according to the setting of a downlink port of other access devices to which a port downlink protocol packet is to be oriented, wherein the update operation comprises: filling an access network address to be allocated in each port downlink protocol packet respectively into a blank item of the address information table, and marking the address occupation information as standby.

The address information table updating module is further configured to update the address information table when receiving a network access command response sent by a switch, wherein the update operation comprises: marking the address occupation information in an item corresponding to the novel network address of the switch as used; updating the device description information as the current switch; and updating the device resource description information as the port information of the current switch and the novel network address information of an access network device connected to a port thereof.

The address information table updating module is further configured to update the address information table when receiving a network access command response sent by a terminal, wherein the update operation comprises: marking the address occupation information in an item corresponding to a novel network address of the terminal as used; updating the device description information as the current terminal; and updating the device resource description information as the port information of the current terminal and a novel network address of an access network device connected to a port thereof.

The centralized control function of the node server is further embodied as follows:

the node server further comprises: a packet check requirement generating module, for generating a data packet check requirement for the service according to a service request protocol packet initiated by a terminal; wherein, the data packet check requirement comprises a check requirement on the destination address, the source address, the data packet type and the packet length of the data packet.

the node server further comprises: a packet check requirement sending module, for sending the data packet check requirement for the service to a switch for traffic control; wherein, the packet check requirement sending module sends the data packet check requirement for the service to a switch for traffic control on the uplink.

The invention further provides a traffic control-based communication system, which comprising:

a node server, a switch for traffic control and a terminal, wherein:

the node server comprises:

a traffic control information generating module, for generating a traffic control information for each service request, wherein the traffic control information includes sending time interval and sending data size; and a traffic control information sending module, for sending the traffic control information for the service to a switch for traffic control;

the switch for traffic control comprises:

a CPU module, for obtaining a traffic control information for each service request from the node server;

a packet buffer, for storing a data packet;

a first network interface, for receiving a data packet;

a second network interface, for sending a data packet;

a switching engine, for putting a data packet received by the first network interface into a packet buffer queue, polling the packet buffer queue, and taking a packet from the packet buffer queue according to the traffic control information and sending the packet via the second network interface; and a terminal, for initiating a service request to the node server, and transmitting a data packet for the service.

Wherein, if the data packet is an uplink data packet, the first network interface will be a downlink network interface, and the second network interface will be an uplink network interface. The first network interface and the second network interface respectively comprise at least one port, and each port is configured with a port receive buffer and a port send buffer, respectively for storing a data packet received and a data packet to be sent.

For realizing accurate traffic control, the switch for traffic control further comprises: a packet checking module, for checking a data packet received, if the data packet meets a check requirement, it allocates a corresponding stream identifier and puts the data packet into a corresponding port receive buffer on the first network interface; then, the switching engine reads a data packet from the port receive buffer on the first network interface, and puts the data packet into a packet buffer queue of the corresponding stream according to the stream identifier. The packet checking module checks whether the destination address, the source address, the data packet type and the packet length of the data packet meet a requirement.

The node server has a centralized control function, which is embodied as follows. The node server further comprises: a packet check requirement generating module, for generating a data packet check requirement for the service according to a service request protocol packet initiated by a terminal; and a packet check requirement sending module, for sending the data packet check requirement for the service to a switch for traffic control. Wherein, the packet check requirement sending module sends the data packet check requirement for the service to a switch for traffic control on the uplink.

For realizing accurate traffic control, the switch for traffic control further comprises: a code rate control module, which is configured by a CPU module, for generating a sending token according to the traffic control information and sending the sending token to the switching engine, wherein the token contains a stream identifier. The switching engine obtains a sending token from the code rate control module, sequentially reads a data packet from the packet buffer queue of the corresponding stream according to the stream identifier in the sending token, and puts the data packet into a port send buffer on the second network interface; the second network interface reads the data packet from the port send buffer and sends the data packet. In addition, the switching engine may further be configured to determine whether the following two conditions are met: 1) the port send buffer on the second network interface is not full; 2) the count of a packet counter in the packet buffer queue of the corresponding stream is larger than 0; when the two conditions are met, it sequentially reads a data packet from the packet buffer queue of the corresponding stream according to the stream identifier in the sending token, and puts the data packet into a port send buffer on the second network interface.

A preferred realization mode is as follows: the sending data size in the traffic control information includes a maximum value of byte that can be sent and a parameter for adjusting the sending of a packet with a variable packet length; the traffic control information sending module sends the traffic control information for the service to a switch for traffic control on the uplink; the switch for traffic control is the first switch of an access terminal.

The centralized control function of the node server is further embodied as follows:

the node server is configured with an address information table, for recording novel network address occupation information, device description information and device resource description information, wherein the device resource description information includes a novel network address of an access network device connected to respective network port of the device and an uplink and downlink traffic count on each network port of the device.

Correspondingly, the node server further comprises the following modules:

a transmission path acquiring module, for looking up the novel network address of an access network device connected to respective network port of the device in the address information table according to a service request protocol packet initiated by a terminal, and obtaining an uplink and a downlink corresponding to the service;

a traffic calculating module, for obtaining the remaining traffic resources on the uplink and downlink for the service according to the uplink and downlink traffic count on each network port of the device in the address information table;

a traffic control module, for checking whether the remaining traffic resources on the uplink and downlink for the service both meet the traffic resources required by the service, if Yes, it triggers the traffic control information generating module to generate a traffic control information corresponding to the service; otherwise, it rejects the service request;

a path notifying module, for sending a transmission path configuration info nation to all switches on the uplink and downlink when the remaining traffic resources on the uplink and downlink for the service both meet the traffic resources required by the service;

a path configuring module, for, when there exist a plurality of uplinks or downlinks for the service and if the remaining traffic resource of one uplink or downlink thereof does not meet the traffic resource required by the service, triggering the traffic control module to continue to check whether the remaining traffic resource on other uplinks or downlinks meet the traffic resource required by the service, if Yes, it triggers the traffic control information generating module to generate a traffic control information corresponding to the service, and triggers the path notifying module to send a transmission path configuration information to all switches on the uplink and downlink; if there exist a plurality of uplinks or downlinks that meet the service, the path configuring module selects one therefrom according to a preset rule.

Correspondingly, the CPU module of the switch is further configured to obtain the transmission path configuration information for each service from the node server, and set a data packet address table according to the transmission path configuration information. The switching engine is further configured to query a data packet address table, and obtain the transmission orientation information of a data packet; then, the second network interface sends a data packet according to the transmission orientation information of the data packet. The data packet address table includes a unitcast data packet address table and a multicast data packet address table, for orienting a unitcast data packet and a multicast data packet respectively.

Correspondingly, the maintaining of the address information table is as follows:

the node server further comprises: an address information table initializing module, for initializing the address information table when the node server is powered on, wherein the initialization operation comprises: filling the novel network address of the node server in a blank item of the address information table, and marking the address occupation information as used; filling the device description information as the current node server; and filling the device resource description information as port information of the current node server;

an address information table updating module, for updating the address information table according to the setting of a downlink port to which each downlink protocol packet is to be oriented in an internal downlink protocol packet address table of the node server, wherein the update operation comprises: filling an access network address to be allocated in each downlink protocol packet respectively into a blank item of the address information table, and marking the address occupation information as standby.

The address information table updating module is further configured to update the address information table according to the setting of a downlink port of other access devices to which a port downlink protocol packet is to be oriented, wherein the update operation comprises: filling an access network address to be allocated in each port downlink protocol packet respectively into a blank item of the address information table, and marking the address occupation information as standby.

The address information table updating module is further configured to update the address information table when receiving a network access command response sent by a switch, wherein the update operation comprises: marking the address occupation information in an item corresponding to the novel network address of the switch as used; updating the device description information as the current switch; updating the device resource description information as the port information of the current switch and the novel network address information of an access network device connected to a port thereof.

The address information table updating module is further configured to update the address information table when receiving a network access command response sent by a terminal, wherein the update operation comprises: marking the address occupation information in an item corresponding to a novel network address of the terminal as used; updating the device description information as the current terminal; and updating the device resource description information as the port information of the current terminal and a novel network address of an access network device connected to a port thereof.

The switch may not only perform traffic control on a data packet, but also perform control on a protocol packet, which may be realized as follows: the first network interface of the switch is further configured to receive a service request protocol packet; the packet checking module is further configured to check the destination address, source address, data packet type and packet length of the service request protocol packet, if the data packet meets a check requirement, it puts the data packet into a corresponding port receive buffer on the first network interface; the switching engine is further configured to read a service request protocol packet from a port receive buffer on the first network interface and put the service request protocol packet into a corresponding packet buffer queue, and poll the packet buffer queue, if the port send buffer on the second network interface is not full and the count of a packet counter in the packet buffer queue is larger than 0, it sequentially reads a service request protocol packet from the packet buffer queue at a predefined time interval and puts the service request protocol packet into a port send buffer on the second network interface; the second network interface is further configured to read a service request protocol packet from the port send buffer and sending the service request protocol packet.

In comparison with the prior art, the invention has the following advantages:

Firstly, the invention puts forward a novel network structure based on accurate traffic control, wherein the network is consisted of a node server with a centralized control function, a switch connected with a node server and a terminal connected with a switch. In such a novel network structure, the node server may control the switch and terminal on each level centralizedly, and allocate a port path and a traffic bandwidth to each service, so that it may know the port traffic information of each switch, thereby generating a traffic control information for the current service. Thus, the switch may obtain the traffic control information from the node server in real time, and perform traffic control on end-to-end data transmission. Moreover, the first uplink switch of an access terminal may accurately control the link traffic of each service, thereby guaranteeing that such link traffic may be linearly superposed (if N services are performs on a port, the total traffic will be the sum of the traffics of said N services); that is, the node server may perform traffic statistics by linearly superposing the traffic on each port of the switch, thus accurate traffic control may be realized.

Secondly, in the traffic control-based data transmission method according to the invention, the traffic control information includes a sending time interval and a maximum value of the number of bytes that can be sent, and a parameter for adjusting the sending of a packet with a variable packet length. The switch for traffic control may send a data traffic input nonuniformly at a uniform code rate according to the traffic control information, thereby stable data transmission may be realized. Moreover, for different data streams (i.e., for different services), there may be different code rate controls. Moreover, in the invention, no requirements is laid on the input of a terminal; that is, the packet sending rate of a terminal to a switch is not limited, and the data access amount of a switch is not limited, either. This is because that in the invention, a data packet received is first stored in a packet buffer queue, and then it is taken from the packet buffer queue for sending according to the traffic control information. Therefore, the setting of packet buffer realizes that no requirement is laid on a terminal.

Thirdly, in the invention, during the process of traffic control, it first checks the contents of a data packet received, for example, destination address, source address, data packet type and packet length, so that a data packet that does not the transmission requirement may be filtered and discarded, thereby improving the security and integrality of the network.

Fourthly, in the network according to the invention, traffic control may be performed on the uplink in the first switch of an access terminal, and traffic control may be performed on both a data packet and a protocol packet on the uplink.

DETAILED DESCRIPTION OF THE EMBODIMENTS

Figure 1:
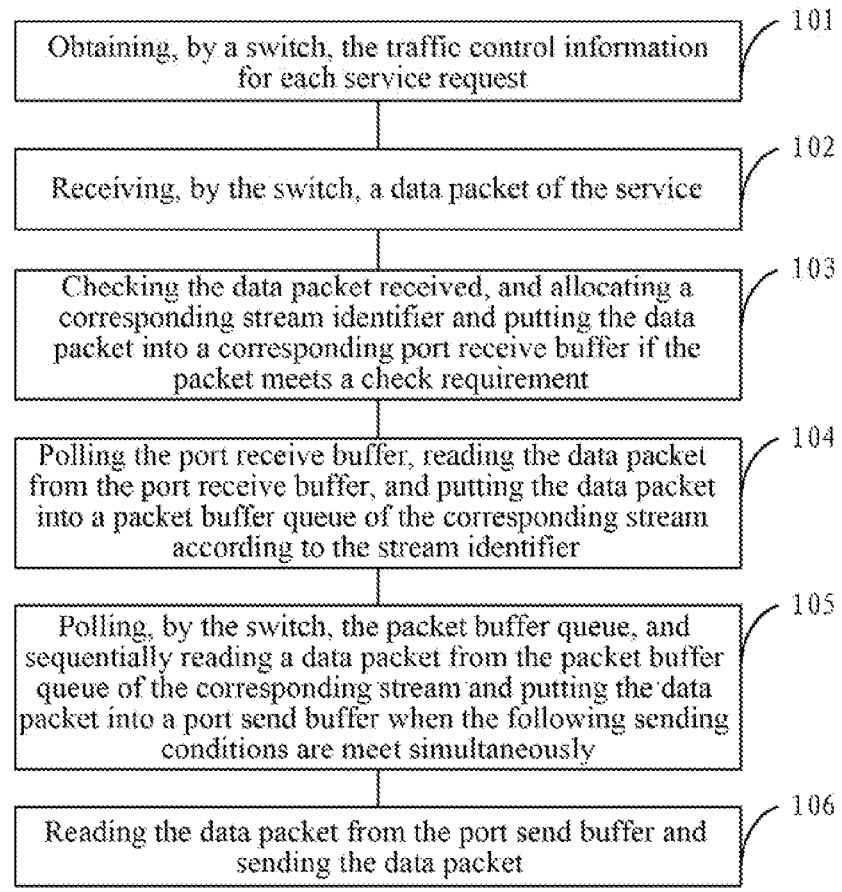
FIG. 1 is a flow chart of the traffic control-based data transmission method according to one embodiment of the invention.

To make the above objects, characteristics and advantages of the invention more apparent, the invention will be further illustrated below in detail in conjunction with the drawings and embodiments.

First, the Design Concept of the Invention Will be Introduced:

The present invention has the following several sufficient conditions for realizing network-wide QoS:

Firstly, the mechanism about "Best Efforts" in the core theories of IP Internet will certainly cause network traffic non-uniformity and frequent packet loss. In fact, TCP protocol just utilizes the packet loss state of the network to adjust the transmission traffic.

Secondly, the mechanism about "Store & Forward" in the core theories of IP Internet will cause a greater non-uniformity of network traffic at the next node at the time it absorbs the local burst traffic.

Thirdly, the mechanism about "Error Detection & Retransmission" in the core theories of IP Internet will cause an intolerable delay in synchronous video communication, thus it has no use value.

Fourthly, successional network traffic non-uniformity or burst traffic will certainly cause periodic switch (router) packet loss.

Thus it can be seen that, because the computer file burst traffic is discrete in essence and has no subsequent burst traffics, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered in the invention that the current various QoS methods are all based on an error hypothesis. According to this hypothesis, the QoS solution is to provide a privilege of being processed preferentially to video traffic. But in fact, because the network traffic needed by different media forms is extremely non-uniform, video traffic will be the absolute main body on the network so long as a few users use a video service.

Seen from another viewpoint, providing a good quality especially to a majority of the network traffics is equivalent to providing a poor quality especially to a minority of the non-video traffics. Since a majority of the network traffics must require QoS, why not provide QoS to the remaining minority of service traffics that does not require QoS? It is assumed that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:
- a switch is set on the entrance ramp of the highway for controlling the macroscopic traffic flow;
- the driving speed is kept stable, thereby improving the traffic rate; and
- road isolations of a concrete structure and flyover crossings, rather than policemen and traffic lights, are employed to restrict vehicle driving.

The embodiments of the invention conform to theory of telephone networks and take three measures similar to those of the above highway:

- the traffic on each path is calculated and measured, once the traffic is to be saturated, it will be bypassed, or new users will be rejected;
- strict uniform-traffic transmission is performed, and in the embodiments of the invention, a packet loss rate of 1/1,000,000 can be attained in TV under a heavy-load traffic of 90%; and
- uplink data matching and traffic control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:
- a price-performance ratio that is a hundredfold of that of IP Internet;
- a method for developing high-quality symmetrical TV without interfering with the existing IP Internet service.

Especially on a large-traffic backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the traffic is occupied 100 percent. Theoretically, a uniform traffic will be obtained after a plurality of uniform traffics are combined. It has been further proved by practice that under the premise of a uniform traffic, the network traffic may reach its limit value, with no packet loss phenomenon appears. Because the video media stream, which occupies over ninety percent of the further network traffic, has the characteristics of a uniform traffic, in the present that takes video service as the main object, the approach to guaranteeing Internet QoS is of course to eliminate source traffic non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media stream of any bandwidth may be obtained by only changing the time interval of packet transmission. To guarantee the uniform-traffic characteristic of the network, it is required by the Internet of the invention that terminal designing must have a uniform-traffic ability. However, in the practical network environment, it cannot expect that all the users autonomously comply with the uniform-traffic specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files. Therefore, it has no future to adapt the IP Internet to video services, and the only way out is to create a new network.

The Implementation Method of the Invention Will be Introduced Below:

In a computer network system, a switch is a device for accomplishing an information switching function in a communication system. The invention provides a traffic control-based data transmission method, which is mainly used by a switch for traffic control.

Referring to FIG. 1, it is a flow chart of the traffic control-based data transmission method according to one embodiment of the invention.

Step 101: Obtaining, by a switch, the traffic control information for each service request, wherein the traffic control information includes sending time interval and sending data size;

That is, each time a terminal initiates a service request, the switch will obtain a traffic control information corresponding to the service in real time, and performs traffic control on data transmission of the service according to the traffic control information. Usually, for different services, the traffic control information of the corresponding stream will be different; for example, network video service and web page browsing service have different requirements on bandwidth resources. Thus, the switch will control the transmission of video data and web page data according to different packet sending intervals and packet sending sizes.

Wherein, for different network structures, the mode in which the switch obtains the traffic control information will be different; however, the method according to this embodiment may be applied for traffic control so long as the switch can obtain the traffic control information of the corresponding stream for each service request.

Step 102: Receiving, by the switch, a data packet of the service.

The data packet may be a data packet transmitted on an uplink, or it may be a data packet transmitted on a downlink.

Step 103: Checking the data packet received, and allocating a corresponding stream identifier and putting the data packet into a corresponding port receive buffer if the packet meets a check requirement;

If the data packet does not meet the check requirement, it is discarded.

This step is a (preferred process, which may improve the security and integrality of network transmission. The checking mode may be as follows: checking whether the destination address, the source address, the data packet type and the packet length of the data packet meet a requirement; by such checking, a data packet that does not meet the requirement may be filtered. However, in practical application, the checking mode may be set according to different application requirements.

In addition, for different services, the corresponding destination address, source address, data packet type and packet length of the data packet will also be different, thus the check requirements for different services will also be different from each other.

For data packets checked that meet the requirement, a data packet of a different service is distinguished by allocating a stream identifier, and it is put into a port receive buffer of the switch. Generally, a switch may have a plurality of ports, which are respectively connected with different network devices, and each port may receive/send data from/to the device connected therewith. Thus, each port is configured with a receive buffer and a send buffer, for temporarily storing data that are received and to be sent. A data packet will be put into the receive buffer of the port from which the data packet is received by the switch.

Step 104: Polling the port receive buffer, reading the data packet from the port receive buffer, and putting the data packet into a packet buffer queue of the corresponding stream according to the stream identifier;

A packet buffer has a larger buffer space, in which the data packets received on each port may be stored. A packet buffer is divided into different data packet queues according to different services.

Step 105: Polling, by the switch, the packet buffer queue, and sequentially reading a data packet from the packet buffer queue of the corresponding stream and putting the data packet into a port send buffer when the following sending conditions are meet simultaneously:

Condition 1: the port send buffer is not full;
Condition 2: the count of a packet counter in the packet buffer queue of the corresponding stream is larger than 0; and
Condition 3: a sending token is generated.

The object of Condition 1 is to guarantee that the port send buffer has enough space to store a data packet read from the packet buffer queue;

The object of Condition 2 is to guarantee that there exists a data packet in the packet buffer queue of the corresponding stream for sending;

The object of Condition 3 is to guarantee that a data packet may be sent according to the packet sending interval and packet sending size of the traffic control.

The above Condition 1 and Condition 2 are basic conditions for sending, and Condition 3 is a key condition, because a switch mainly performs traffic control according to Condition 3.

The sending token is generated by the switch according to the traffic control information, and the token contains a stream identifier, for indicating the data packet of which service may be sent currently. When the above three conditions are met simultaneously, the switch sequentially reads a data packet from the packet buffer queue of the corresponding stream according to the stream identifier in the sending token, and put the data packets into a port send buffer.

Step 106: Reading the data packet from the port send buffer and sending the data packet.

The Invention Will be Illustrated in Detail Below Via a Traffic Control on a Novel Network.

Novel network has a network structure that is controlled centralizedly. It may be the types of tree network, star network and ring network, etc.; but on this basis, a centralized control node is needed on the network to control the whole network.

I. Novel Network Device and Data Structure 1.1 Classification of Novel Network Device 1.1.1 Device in the novel network system of this embodiment may be mainly divided into 3 categories: a server, a switch and a terminal (including various set-top boxes, code plates and storages, etc.). Generally, the novel network may be divided into a metropolitan area network (or state network and global network, etc.) and an access network.

1.1.2 Devices on the access network part may be mainly divided into 3 categories: a node server, an access switch and a terminal (including various set-top boxes, code plates and storages, etc.). Wherein, the node server is a node that has centralized control function in the access network, and it can control the access switch and the terminal. The node server may be directly connected with the access switch, and it may also be directly connected with the terminal.

The specific hardware structure of each access network device is as follows:

1) Node Server

Figure 2:
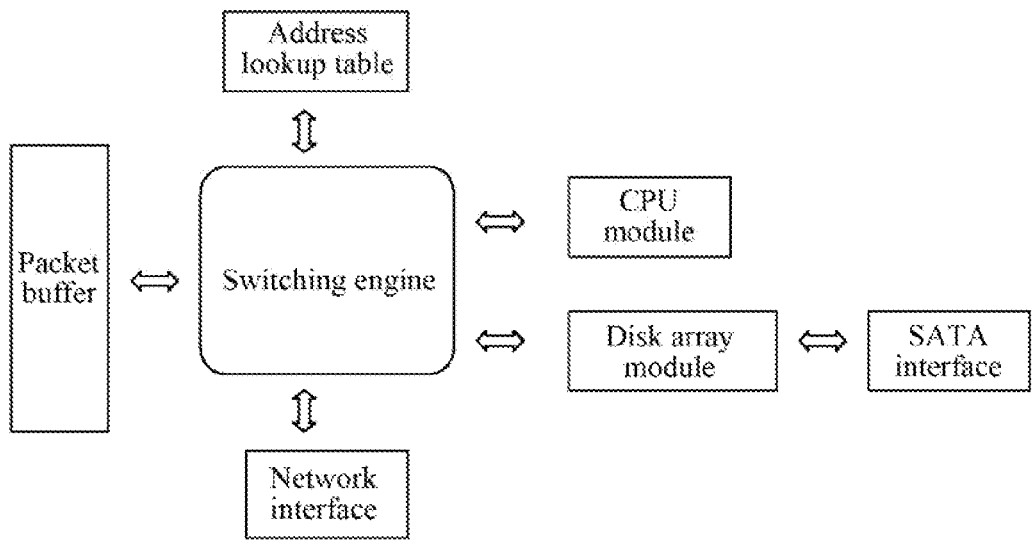
FIG. 2 is a schematic diagram showing the internal structure of a node server on the novel network according to one embodiment of the invention.

As shown in FIG. 2, a node server mainly includes a network interface module, a switching engine module, a CPU module and a disk array module;

Wherein, packets coming from the network interface module, the CPU module and the disk array module all enter the switching engine module; the switching engine module performs an operation of checking the address table on the packets, so that the orientation information of the packets is obtained; the packets are stored in the corresponding packet buffer queue according to the orientation information of the packets; if the packet buffer queue is to be full, the packets are discarded; the switching engine module polls all the packet buffer queues, and forwards the queue if the following conditions are met: 1) the port send buffer is not full; 2) the count of the packet counter in the queue is greater than 0. The disk array module mainly realize the control on a hard disk, including operations of initialization, read and write, etc., on the hard disk; the CPU module is mainly responsible for the protocol processing with the access switch and the terminal, the configuring of the address table (including downlink protocol packet address table, uplink protocol packet address table and data packet address table), and the configuring of the disk array module.

2) Access Switch

Access switch is divided into an access switch for traffic control and an access switch not for traffic control, wherein the access switch not for traffic control mainly includes a network interface module, a switching engine module and a CPU module, and for the module processing procedure, reference may be made to the above node server.

Figure 3:
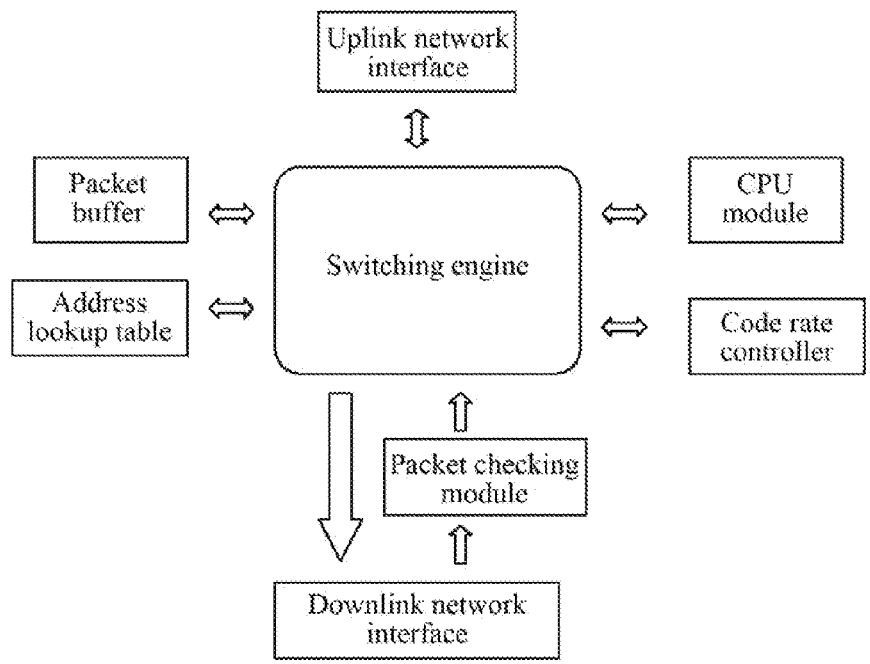
FIG. 3 is a schematic diagram showing the internal structure of an access switch on the novel network according to one embodiment of the invention.

The structure of the access switch for traffic control is as follows:

As shown in FIG. 3, the access switch mainly includes a network interface module (downlink network interface module and uplink network interface module), a switching engine module, a CPU module, a packet checking module, a code rate control module and a packet buffer;

Wherein, a packet coming from the downlink network interface module (uplink data) enters the packet checking module; the packet checking module checks whether the destination address (DA), source address (SA), data packet type and packet length of the packet meet a requirement, if yes, it allocates a corresponding stream identifier (stream-id), and puts the packet into the switching engine module; otherwise, it discards the packet. A packet coming from the uplink network interface module (downlink data) enters the switching engine module; a packet coming from the CPU module enter the switching engine module; the switching engine module performs an operation of checking the address table on the packet, so that the orientation information of the packet is obtained; if the packet entering the switching engine module goes from a downlink network interface to an uplink network interface, the packet is stored in the corresponding packet buffer queue in conjunction with the stream identifier (stream-id); if the packet buffer queue is to be full, the packet is discarded; if the packet entering the switching engine module does not go from a downlink network interface to an uplink network interface, the packet is stored in the corresponding packet buffer queue according to the orientation information of the packet; if the packet buffer queue is to be full, the packet is discarded.

The switching engine module polls all the packet buffer queues, and it is divided into two cases here:

if the queue goes from a downlink network interface to an uplink network interface, it will be forwarded when the following conditions are met: 1) the port send buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port send buffer is not full; 2) the count of the packet counter in the queue is greater than 0.

The code rate control module is configured by the CPU module, and a token is generated for all packet buffer queues that go from a downlink network interface to an uplink network interface in a programmable interval, for controlling the code rate of uplink forwarding.

The CPU module is mainly responsible for the protocol processing with the node server, the configuring of the address table and the configuring of the code rate control module 208.

3) Terminal

A terminal mainly comprises a network interface module, a service processing module and a CPU module; for example, a set-top box mainly comprises a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.1.3 The device on the metropolitan area network part may be mainly divided into 2 categories: a node server, a node switch and a metropolitan area server.

Wherein, the node switch mainly includes a network interface module, a switching engine module and a CPU module; the metropolitan area server mainly comprises a network interface module, a switching engine module and a CPU module. The node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server.

1.2 Definition of Novel Network Data Packet

Figure 4:
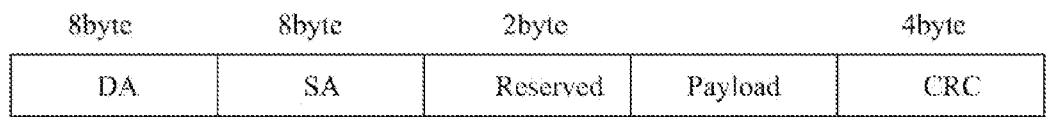
FIG. 4 is a schematic diagram showing the data structure on the novel network according to one embodiment of the invention.

As shown in FIG. 4, a novel network data packet mainly includes the following parts: destination address (DA), source address (SA), reserved byte, payload (PDU) and CRC. Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases;

CRC is consisted of 4 bytes, and the calculation method thereof conforms to standard Ethernet CRC algorithm.

1.3 Implementation of Novel Network

In order to simplify the design, four types of data packets are defined on the access network, respectively:

1) downlink protocol packet (a protocol packet sent from a node server to an access switch or a terminal);

2) uplink protocol packet (a protocol packet replied by an access switch or a terminal to a node server);

3) unicast data packet; and 4) multicast data packet;

In addition, on the access network, for the above 4 data packet types, the following 4 address lookup tables are set in the node server and the node switch, for performing transmission orientation on a data packet or a protocol packet according to the corresponding address lookup table after receiving various types of data packets or protocol packets. Correspondingly, the address lookup table is divided into:

1) protocol packet address table: which is also referred to as downlink protocol packet address table for transmitting and orienting a query packet or a service request protocol packet;

2) response packet address look-up table: which is also referred to as uplink protocol packet address table, for transmitting and orienting a response packet;

3) unicast data packet address table: for transmitting and orienting a unicast data packet; and 4) multicast data packet address table: for transmitting and orienting a multicast data packet.

For example, an access network address is consisted of 16 bits, so the total number of access switches and terminals that can be accessed will be 65536. It is assumed that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100 Mbps network interface, 8 downlink 100 Mbps network interfaces and 1 CPU module interface. If the 8 downlink 100 Mbps network interfaces are in turn defined as port 0 to port 7, the CPU module interface is defined as port 8, and the uplink 100 Mbps network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is assumed that a data packet coming from port 9 has a destination address (DA) of 0x8056 0x1500 0x0000 0x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

Figure 5:
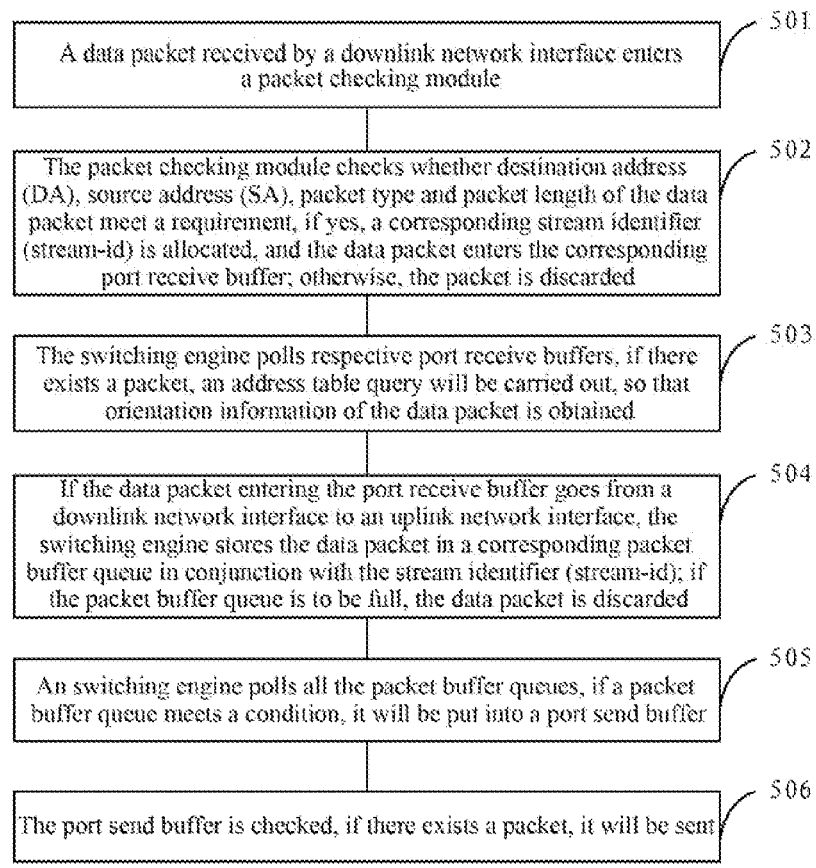
FIG. 5 is a flow chart of a process in which an access switch performs traffic control according to one embodiment of the invention.

II. The First Switch of an Access Terminal Performs Traffic Control on an Uplink Referring to FIG. 5, it is a flow chart of a process in which an access switch performs traffic control according to one embodiment of the invention.

Step 501: A data packet received by a downlink network interface enters a packet checking module;

Step 502: The packet checking module checks whether the destination address (DA), source address (SA), packet type and packet length of the data packet meet a requirement, if yes, it allocates a corresponding stream identifier (stream-id), and the data packet enters the corresponding port receive buffer; otherwise, the packet is discarded;

However, a data packet received by the uplink network interface directly enters the corresponding port receive buffer, and a data packet received by the CPU module interface also directly enters the corresponding port receive buffer. This is because that only uplink forwarding is controlled in this embodiment. Therefore, the data packets received by the uplink network interface and the CPU module interface will not be checked.

In this embodiment, stream identifier (stream-id) may be of 8 bit, which corresponds to 256 stream types.

Step 503: The switching engine polls respective port receive buffers, if there exists a packet, an address table query will be carried out, so that orientation information of the data packet is obtained;

The packet address table will be looked up for a data packet; if it is a unicast data packet, table 2 will be looked up, and if it is a multicast data packet, table 3 will be looked up.

Step 504: If the data packet entering the port receive buffer goes from a downlink network interface to an uplink network interface, the switching engine stores the data packet in a corresponding packet buffer queue in conjunction with the stream identifier (stream-id); if the packet buffer queue is to be full, the data packet is discarded;

If the data packet entering the port receive buffer does not go from a downlink network interface to an uplink network interface (for example, it goes from an uplink network interface to a downlink network interface, or goes from a CPU module interface to a downlink network interface, etc.), the switching engine stores the data packet in a corresponding packet buffer according to the orientation information of the packets; if the packet buffer queue is to be full, the packets are discarded;

In the packet buffer, provided that there exist 256 stream types, then there may be 256 buffers, for buffering the data packets corresponding to different streams respectively.

The above describes the receiving part of a packet, and the sending part of a packet will be described below.

Step 505: A switching engine polls all the packet buffer queues, which may be divided into the following two situations:

First Situation: if the queue goes from a downlink network interface to an uplink network interface, it will be forwarded when the following conditions are met:

1) the port send buffer is not full;

2) the count of the packet counter in the queue is larger than 0; and 3) a token generated by a code rate control module is obtained;

wherein, so-called forwarding represents that a packet is read by the switching engine from the packet buffer queue sequentially, and then written into the port send buffer of the uplink network interface.

Second Situation: if the queue does not go from a downlink network interface to an uplink network interface, it will be forwarded when the following conditions are met:

1) the port send buffer is not full; and
2) the count of the packet counter in the queue is larger than 0.

Step 506: The port send buffer is checked, if there exists a packet, it will be sent.

In this embodiment, the access switch is based on a storing-forwarding mechanism, all ports have a receive buffer and a send buffer, and these buffers are set inside the switch chip, so they cannot be too large, and the each size of receive buffer and send buffer is between 2 kbyte and 4 kbyte, which can buffer about 2 to 3 maximum Ethernet packet (about 1556 bytes). However, these buffers are not enough, so packet buffers need to be added outside the switch chip, and grain packet buffers such as SDRAM and SRAM, etc., are usually employed; for example, a 16-Mbyte SDRAM may be used as a packet buffer, which may store 10K maximum Ethernet packets (about 1556 bytes). So-called port send buffer not full represents that the port send buffer can at least store a further maximum Ethernet packet (about 1556 bytes), thus it may guarantee that no send buffer will be overflown.

The process in which a code rate control module generates a token will be illustrated in detail below according to an example.

A code rate control module of an access network switch configures a group of counters for each stream, which are respectively defined as follows:

bit (68)=op '0'→reset, '1'→normal
bit (67 downto 60)=frame_cnt 0-255
bit (59 downto 50)=frame_4 byte –511-511
bit (49 downto 41)=max_frame_4 byte 0-511
bit (40 downto 32)=add_4 byte 0-511
bit (31 downto 16)=timer_set
bit (15 downto 0)=timer_cnt bit (68)=op, when op='0', it represents that the counter is to be initialized as zero; when op='1', it represents a normal operation.

bit (67 downto 60)=frame_cnt, it represents the packet count in the packet buffer queue, which is assumed as 8 bit (0-255);

bit (59 downto 50)=frame 4 byte, it represents the number of bytes that can be sent (it should be noted that frame_4 byte is a 4-byte counter, and provided that frame_4 byte=4, it represents that the number of bytes that can be sent is 16, and at the same time, the counter can be negative, which is assumed here as 10 bit, so the range is –511-511);

bit (49 downto 41)=max_frame_4 byte, it represents the maximum value of the number of bytes that can be sent, which is assumed here as 9 bit (0-511);

bit (40 downto 32)=add_4 byte, it represents the number of bytes that can be sent, which is added each time a fixed time elapses (it should be noted that add_4 byte is a 4-byte counter, and provided that add_4 byte=4, it represents that the added number of bytes that can be sent is 16, which is assumed here as 9 bit, so the range is 0-511);

bit (31 downto 16)=timer_set, it represents a time interval that is set, provided that the system query period is 50 us, if timer_set=100, it represents that the time interval that is set will be 50 us×100=5 ms, which is assumed here as 16 bit;

bit (15 downto 0) timer_cnt, it represents a system query period counter, provided that the system query period is 50 us, it represents that timer_cnt is increased by 1 each 50 us, which is assumed here as 16 bit.

It is assumed that there are totally 256 streams, then 256 groups of counters will be maintained in the code rate control module. The processing time of the code rate control module on each group of counters is 10 clock cycles and the frequency of the system clock is 1.25 MHz, that is, the clock cycle is 8 ns. Then, the time needed to processing 256 groups of counters will be 256×10×8 ns=20480 ns=20.48 us, and provided that the system query period is 50 us, then a very large redundancy exists.

For easy description, it is assumed here that the counter of the 50th stream is respectively set as follows:

timer_set=100,
add_4 byte=16,
frame_4 byte=–10,
max_frame_4 byte=400,
frame_cnt=2.

The code rate control module checks the counter of the $50^{th}$ stream, if timer_cnt=timer_set (100), which represents that the packet sending time comes according to the time interval that is set, then frame 4 byte=frame_4 byte+add_4 byte, and it determines whether frame_4 byte is larger than max_frame_4 byte, if Yes, frame_4 byte=max_frame_4 byte. In the above example, frame_4 byte=frame_4 byte+add_4 byte=–10+16=6, which is less than max_frame_4 byte (400).

Then, if frame_4 byte is larger than 0 and frame_cnt is larger than 0, the code rate control module sends a token to the switching engine (in the example, the token number is 50). The switching engine takes a packet from the corresponding packet buffer queue this example, packet buffer queue 50) according to the token number, and sends it; and at the same time, it returns the packet length to the code rate control module. The code rate control module subtracts the corresponding packet length from frame_4 byte, and provided that the packet length frame_length=20 (an integral multiple of 4 byte), then frame_4 byte=frame_4 byte–frame_length=6–20=–14.

The above counters op, max_frame_4 byte, add_4 byte and timer_set will be traffic control information, which are all configured by the CPU module (which are obtained via the protocol interaction with the node server), timer_cnt is initialized as 0, and it is increased by 1 each time a system query period elapses; frame_cnt is initialized as 0, and if a packet is added to the packet buffer queue, frame_cnt will be increased by 1. The code rate control module may convert a nonuniform data stream, which is input, into a uniform data stream for sending by controlling the parameters of max_frame_4 byte, add_4 byte, timer_set. For example, if a data stream with a packet length of 1024 byte and an interval of 5 ms need to be output, it sets as follows:

max_frame_4 byte=256 (1024 byte),
add_4 byte=256 (1024 byte),
timer_set=100 (it is assumed that system query period is 50 μs).

It can be known from the above that, for different services, the corresponding stream will be different, then the traffic control information obtained by the CPU module from the node server will be different, too. Moreover, the above code rate control not only can control a packet with a fixed packet length, but also can control a packet with a variable packet length, wherein a packet with a variable packet length represents that the packet length is variable each time it is input into the switch. This is because that the data size that can be sent each time is determined by the maximum value max_frame_4 byte of byte that can be sent and the parameter add_4 byte for adjusting the sending of a packet with a variable packet length.

On the novel network, parameters max_frame_4 byte, add_4 byte and tinier set controlled by the code rate control module are configured by the CPU module, while the CPU module obtains such traffic control information from the node server. A preferred method will be introduced below, which specifically illustrates how a code rate control module obtains traffic control information from the node server, so that accurate traffic control may be realized.

All devices that access the novel network (including terminal, access switch, storage and even the node server itself) have a unique access network address. An address information table may be maintained in the CPU module of the node server, and the item corresponding to each address is consisted as follows:

1) address occupation descriptor: "00" represents that the address is not used, "01" represents that the address is standby (the node server uses the address to issue a port query packet, but no network access response packet is received), "10" represents that the address is used (which is set after the node server receives a network access response packet);

2) device descriptor: fir example, "000000" represents a node server, "000001" represents an access switch, "000010" represents a storage, and "000011" represents a terminal;

3) device resource description information: for example, if the device is an access switch, the description information will be the access network address of a device connected to a network port thereof and the uplink and downlink traffic count on each network port thereof; if the device is a storage, the description information will be the access network address of a device connected to a network port thereof, the count of read-write channels thereof and uplink and downlink traffic count of a network port thereof. All the information is used to provide a decision-making foundation to the service process, and the information will be modified during each service process.

Each time a terminal initiates a service request, the node server may know the destination address (DA) and source address (SA) of the current service according to the service request protocol packet, then it looks up in an address information table, and it may obtain the uplink and downlink corresponding to the current service according to the novel network address of a device connected to respective network port of the device in each item; and it obtains the remaining traffic resources on the uplink and downlink for the service according to the uplink and downlink traffic count on each network port of the device. The node server checks whether the remaining traffic resources on the uplink and downlink for the service both meet the traffic resources required by the service, if Yes, it generates a traffic control information corresponding to the service, and sends the traffic control information to the access switch for traffic control on the link; otherwise, it rejects the service request.

In addition, if the remaining traffic resources on the uplink and downlink for the service both meet the traffic resources required by the service, the node server will also send the transmission path configuration information to all access switches on the uplink and downlink, and all the access switches will set their respective data packet address tables according to the configuration information.

Preferably, the switch for traffic control may be the first switch of an access terminal, thus traffic control may be performed on the data sent by the terminal at once, and the subsequent access switches may not perform the above traffic control any more, thus data transmission time may be saved.

Preferably, when there exist a plurality of uplinks or downlinks for the service and if the remaining traffic resource of one uplink or downlink thereof does not meet the traffic resource required by the service, the node server continues to check whether the remaining traffic resource on other uplinks or downlinks meet the traffic resource required by the service, if Yes, it generates a traffic control information corresponding to the service, and sends the transmission path configuration information to all access switches on the uplink and downlink, and all the access switches set their respective data packet address tables according to the configuration information. If the node server obtains a plurality of uplinks or downlinks that meet the service, it selects one therefrom according to a preset rule. The preset rule is as follows: the node server acquires the traffic information of each link and the traffic information of the current service, and a communication link with the minimum traffic used is determined as the communication link of the current service. Or, the preset rule is as follows: the node server acquires the bandwidth information of each link and the bandwidth information of the current service, and a link with the maximum bandwidth is determined as the communication link of the current service.

In addition, the access switch may also perform traffic control on a service request protocol packet initiated by a terminal, and the specific control mode is as follows:

A first network interface receives a service request protocol packet; a packet checking module checks the destination address, source address, data packet type and packet length of the service request protocol packet, if the data packet meets a check requirement, it puts the data packet into a corresponding port receive buffer on the first network interface; a switching engine reads a service request protocol packet from a port receive buffer on the first network interface, and puts the service request protocol packet into a corresponding packet buffer queue; it polls the packet buffer queue, if the port send buffer on the second network interface is not full and the count of a packet counter in the packet buffer queue is larger than 0, it sequentially reads a service request protocol packet from the packet buffer queue at a predefined time interval and puts the service request protocol packet into a port send buffer on the second network interface; the second network interface reads a service request protocol packet from the port send buffer and sends the packet.

In order to illustrate the address information table on a node server in more detail, a network management process and a service process between a node server and an access switch (including an access switch for traffic control) and between a node server and a terminal will be introduced below.

Figure 6:
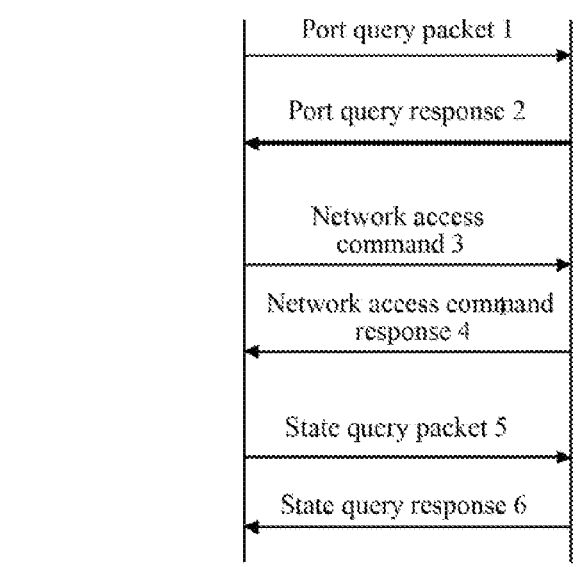
FIG. 6 is a schematic flow chart of a process in which an access switch accesses the novel network according to one embodiment of the invention.

III. Network Management Process of an Access Network Device 3.1 Network Access Process of an Access Switch Firstly, each access switch that is allowed to access the network must be registered on the node server, and an access switch that is not registered will be unable to access the network. As shown in FIG. 6, the process in which the access switch accesses the network relates to the following steps:

1) A node server sends a query packet to each port, and after the access switch receives the query packet, it sends a response packet, which contains the registration information of the current access switch;

2) After the node server receives the response issued by the access switch, it will know the port under which an access switch is connected, then the information of the access switch is found in an internal registration information table of the node server, a network access command is sent to the access switch (informing it of the access network address), and after the access switch receives the network access command, it accesses the network and sends a network access command response to the node server simultaneously;

3) After the node server receives the network access command response issued by the access switch, it will know that the access switch has accessed the network, then a device state query instruction is sent to the port periodically to check whether the access switch works normally, and at the same, a port query packet is sent to the downlink port of the access switch to check whether other access network devices are connected under the access switch, if the current access switch works normally, it will send a state query response to the node server after receiving a device state query instruction. When no state query response is received by the node server in a certain period of time, it will be considered that the access switch has been removed from the network, and no device state query instruction will be sent any longer; instead, it continues to send a query packet to the current port.

3.2 Network Access Process of a Terminal

Figure 7:
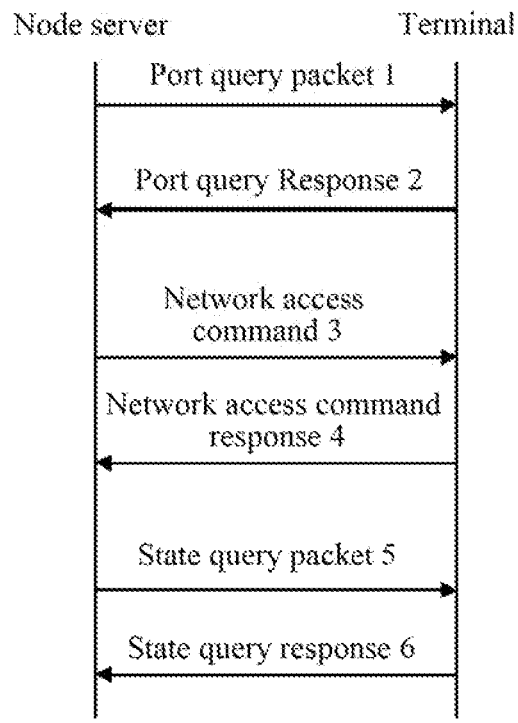
FIG. 7 is a schematic flow chart of a process in which a terminal accesses a novel network according to one embodiment of the invention.

Firstly, each terminal that is allowed to access the network must be registered on the node server, and a terminal that is not registered will be unable to access the network. As shown in FIG. 7, the process in which a terminal accesses the network relates to the following steps:

1) A node server sends a query packet to each port, and after the terminal receives the query packet, it sends a response packet, which contains the registration information of a terminal;

2) After the node server receives the response packet issued by the terminal, it will know what terminal (set-top box, code plate or storage) is connected under which port, then the information of the terminal is found in an internal registration information table of the node server, and a network access command is sent to the terminal (informing the access network address of the terming), and after the terminal receives the network access command, accesses the network and sends a network access command response to the node server simultaneously;

3) After the node server receives the network access command response issued by the terminal, it will know that the current terminal has accessed the network, then a device state query instruction is sent to the port periodically to check whether the terminal works normally. If the terminal works normally, after it receives the device state query instruction, it will send a state query response to the node server. When no state query response is received by the node server in a certain period of time, it will be considered that the current terminal has been removed from the network, and no device state query instruction will be sent any longer; instead, it continues to send a query packet to the current port.

3.3 An Example of the Interaction Between a Node Server and an Access Switch, a Terminal During a Network Access Process:

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, in the case of an access switch, the access network address of a device connected with its network port and the uplink and downlink traffic count of each of its network ports; in the case of storage, the access network address of a device connected with its network port and the uplink, the count of its read and write channels and uplink and downlink traffic count of its network port; and so on. All the information is used to provide a decision-making foundation to the service process, and the information will be modified during each service process.

Figure 8:
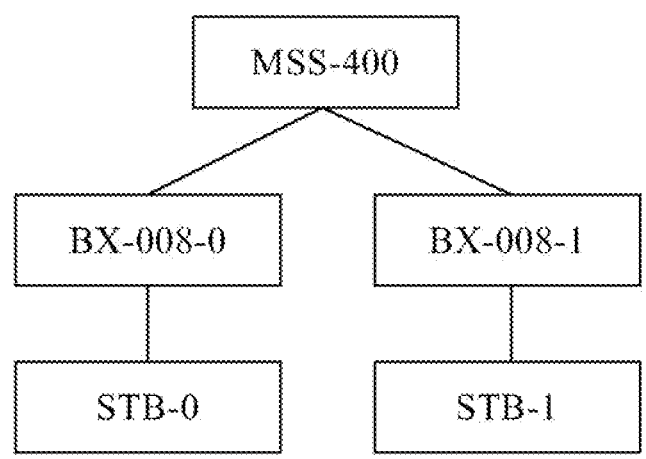
FIG. 8 is an exemplary connection diagram showing the interaction between the node server and the access switch, terminal during the network access process according to embodiment of the invention.

As shown in FIG. 8, it is assumed that there exists a node server MSS-400, port 0 thereof is connected with an access switch BX-008-0, port 1 thereof is connected with an access switch BX-008-1, and port 0 of BX-008-0 is connected with a set-top box STB-0, port 1 of BX__008-1 is connected with a set-top box STB-1.

1) After server MSS-400 is powered on, it initializes the hardware, obtains the default metropolitan area network address (which is assumed as 0x00 0x0000 0x0000), and imports a configuration file from the hard disk to the CPU memory (for example, the registration information of an switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:

address occupation descriptor: "10" represents that the address is used;

device descriptor: "000000" represents node server;

device resource description information: the node server has 8 downlink 100 Mbps network interfaces in turn defined as port 0 to port 7, 1 CPU module interface defined as port 8, 1 disk array interface defined as port 9 and 1 uplink 1000 Mbps fiber interface defined as port 10, and the type of this node server is MSS-400, the access network address of a device connected with its network port is not allocated, and uplink and downlink traffic count of each of its network ports is 0;

the next available address of the address information table is 0x0001;

2) Server MSS-400 initializes tables 0, 1, 2 and 3:

configuring table 0 as "000 0000 0000", i.e., the transmission of all down protocol packets is closed;

configuring table 1 as "001 0000 0000", all uplink protocol packets are oriented to the CPU;

configuring tables 2 and 3 as "000 0000 0000", i.e., all unicast or multicast data packet transmission is closed;

3) Server MSS-400 knows that it has 8 downlink ports and the next available address is 0x0001, so it configures the 8 items of table 0 respectively as:

"00 0000 0000 0000 0001"=>"000 0000 0001", i.e., a query packet with a destination address (DA) of 0x8000 0x0000 0x0000 0x0001 is oriented to port 0;

"00 0000 0000 0000 0010"=>"000 0000 0010", i.e., a query packet with a destination address (DA) of 0x8000 0x0000 0x0000 0x0002 is oriented to port 1;

"00 0000 0000 0000 0011"=>"000 0000 0100", i.e., a query packet with a destination address (DA) of 0x8000 0x0000 0x0000 0x0003 is oriented to port 2;

"00 0000 0000 0000 0100"=>"000 0000 1000", i.e., a query packet with a destination address (DA) of 0x8000 0x0000 0x0000 0x0004 is oriented to port 3;

"00 0000 0000 0000 0101"=>"000 0001 0000", i.e., a query packet with a destination address (DA) of 0x8000 0x0000 0x0000 0x0005 is oriented to port 4;

"00 0000 0000 0000 0110"=>"000 0010 0000", i.e., a query packet with a destination address (DA) of 0x8000 0x0000 0x0000 0x0006 is oriented to port 5;

"00 0000 0000 0000 0111"=>"000 0100 0000", i.e., a query packet with a destination address (DA) of 0x8000 0x0000 0x00000x0007 is oriented to port 6;

"00 0000 0000 0000 1000"=>"000 1000 0000", i.e., a query packet with a destination address (DA) of 0x8000 0x0000 0x0000 0x0008 is oriented to port 7;

4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x0000 0x0000 0x0007, 0x8000 0x0000 0x0000 0x0008 (with an SA of 0x0000 0x0000 0x0000 0x0000), and according to the configuration of its table 0, the query packets will be in turn oriented to ports 0 to 7; at this point, items 0x0001 to 0x0008 of the address information table are configured as:

address occupation descriptor: "01" represents that the address is standby;
device descriptor: it will not be modified;
device resource description information: it will not be modified;

The next available address of the address information table is 0x0009;

5) After switches BX-008-0 and BX-008-1 are powered on, they initializes the hardware:

configuring its table 0 "00 xxxx xxxx xxxx xxxx" as "01 0000 0000", i.e., all downlink protocol packets are oriented to the CPU;
configuring its table 1 "01 xxxx xxxx xxxx xxxx" as "10 0000 0000", i.e., all uplink protocol packets are oriented to the uplink 100 Mbps network interface;
configuring its tables 2 and 3 as "00 0000 0000", i.e., all unicast or multicast data packet transmission is closed;

6) After switch BX-008-0 receives a query packet, it receives the query packet to its CPU module according to the configuration of its table 0, the CPU module parses the query packet and generates a response packet (which contains the registration information of the current access switch) and sends it to server MSS-400, wherein DA of the packet is 0x0800 0x0000 0x0000 0x0000, and SA is 0x0000 0x0000 0x0000 0x0001;

7) After server MSS-400 receives the response packet issued by switch BX-008-0 and contrasts the source address (SA) of the response packet and the device type, it will know that its port 0 is connected with an access switch, then the information of the access switch is found in an internal registration information table of the node server, and a network access command is sent to the access switch (informing that the access network address thereof is 0x0001);

8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; and at the same time, a network access command response is sent to the server;

9) After server MSS-400 receives the network access command response issued by switch BX-008-0, it will know that switch BX-008-0 has accessed the network, then item 0x0001 of the internal address information table of the server is configured as:

address occupation descriptor: "10" represents that the address is used;
device descriptor: "000001" represents an access switch BX-008;
device resource description information: the access switch has 8 downlink 100 Mbps network interfaces defined in turn as port 0 to port 7, 1 CPU module interface defined as port 8 and 1 uplink 100 Mbps network interface defined as port 9, the model of the access switch is BX-008, the access network address of the device connected with its uplink network port is 0x0000 (i.e., MSS-400), the access network address of the device connected with the downlink network port is not allocated, and uplink and downlink traffic count of each of its network ports is 0;

Then, a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:

"00 0000 0000 0000 1001"=>"000 0000 0001", i.e., a port downlink protocol packet with a destination address (DA) of 0x8000 0x0000 0x0000 0x0009 is oriented to port 0;

"00 0000 0000 0000 1010"=>"000 0000 0001", i.e., a port downlink protocol packet with a destination address (DA) of 0x8000 0x0000 0x0000 0x000a is oriented to port 0;

"00 0000 0000 0000 1011"=>"000 0000 0001", i.e., a port downlink protocol packet with a destination address (DA) of 0x8000 0x0000 0x0000 0x000b is oriented to port 0;

"00 0000 0000 0000 1100"=>"000 0000 0001", i.e., a port downlink protocol packet with a destination address (DA) of 0x8000 0x0000 0x0000 0x000c is oriented to port 0;

"00 0000 0000 0000 1101"=>"000 0000 0001", i.e., a port downlink protocol packet with a destination address (DA) of 0x8000 0x0000 0x0000 0x000d is oriented to port 0;

"00 0000 0000 0000 1110"=>"000 0000 0001", i.e., a port downlink protocol packet with a destination address (DA) of 0x8000 0x0000 0x0000 0x000e is oriented to port 0;

"00 0000 0000 0000 1111"=>"000 0000 0001", i.e., a port downlink protocol packet with a destination address (DA) of 0x8000 0x0000 0x0000 0x000f is oriented to port 0;

"00 0000 0000 0001 0000"=>"000 0000 0001", i.e., a port downlink protocol packet with a destination address (DA) of 0x8000 0x0000 0x0000 0x0010 is oriented to port 0;

Server MSS-400 will notify switch BX-008-0 to perform the following configurations in its table 0 via a port allocation packet containing port allocation information:

"00 0000 0000 0000 1001"=>"00 0000 0001", i.e., a port downlink protocol packet with a destination address (DA) of 0x8000 0x0000 0x0000 0x0009 is oriented to port 0;

"00 0000 0000 0000 1010"=>"00 0000 0010", i.e., a port downlink protocol packet with a destination address (DA) of 0x8000 0x0000 0x0000 0x000a is oriented to port 1;

"00 0000 0000 0000 10111"=>"00 0000 01100", i.e., a port downlink protocol packet with a destination address (DA) of 0x8000 0x0000 0x0000 0x000b is oriented to port 2;

"00 0000 0000 0000 1100"=>"00 0000 1000", i.e., a port downlink protocol packet with a destination address (DA) of 0x8000 0x0000 0x0000 0x000c is oriented to port 3;

"00 0000 0000 0000 1101"=>"00 0001 0000", i.e., a port downlink protocol packet with a destination address (DA) of 0x8000 0x0000 0x0000 0x000d is oriented to port 4;

"00 0000 0000 0000 1110"=>"00 0010 0000", i.e., a port downlink protocol packet with a destination address (DA) of 0x8000 0x0000 0x0000 0x000e is oriented to port 5;

"00 0000 0000 0000 1111"=>"00 0100 0000", i.e., a port downlink protocol packet with a destination address (DA) of 0x8000 0x0000 0x0000 0x000f is oriented to port 6;

"00 0000 0000 0001 0000"=>"00 1000 0000", i.e., a port downlink protocol packet with a destination address (DA) of 0x8000 0x0000 0x0000 0x0010 is oriented to port 7;

10) Server MSS-400 sends port downlink protocol packets with destination addresses (DA) of 0x8000 0x0000 0x0000 0x0009, 0x8000 0x0000 0x0000 0x000a, 0x8000 0x0000 0x0000 0x000b, 0x8000 0x0000 0x0000 0x000c, 0x8000 0x0000 0x0000 0x000d, 0x8000 0x0000 0x0000 0x000e, 0x8000 0x0000 0x0000 0x000f, 0x8000 0x0000 0x0000 0x0010 (with an SA of 0x0000 0x0000 0x0000 0x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; moreover, items 0x0009 to 0x0010 of the address information table on server MSS-400 are configured as:

address occupation descriptor: "01" represents that the address is standby;
device descriptor: it will not be modified;
device resource description information: it will not be modified;
The next available address is 0x0011;

11) After STB-0 receives a port downlink protocol packet from port 0 of switch BX-008-0 (i.e., a port downlink protocol packet with a destination address of 0x8000 0x0000 0x0000 0x0009), it sends a port uplink protocol packet (which contains the registration information of the current terminal), wherein DA of the packet is 0x0800 0x0000 0x0000 0x0000, and SA is 0x0000 0x0000 0x0000 0x0009 (port 0 of the switch);

12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

13) After STB-0 receives the network access command and knows that its own access network address is 0x0009, it accesses the network and sends a network access command response to the server simultaneously;

14) After server MSS-400 receives the network access command response issued by STB-0, it will know that switch STB-0 has accessed the network, then item 0x0009 of the address information table is configured as:

address occupation descriptor: "10" represents that the address is used;
device descriptor: "000011" represents a terminal;
device resource description information: the terminal has a video and audio coding/decoding engine and a 100 Mbps network interface, the type of the terminal is STB, the access network address of a device connected with its network port is 0x0001 (i.e., BX-008-0), and the uplink and downlink traffic count of its network port is 0;

Item 0x0001 of the address information table is configured as:

address occupation descriptor: it will not be modified;
device descriptor: it will not be modified;
device resource description information: the access switch has 8 downlink 100 Mbps network interfaces defined in turn as port 0 to port 7, 1 CPU module interface defined as port 8 and 1 uplink 100 Mbps network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and uplink and downlink traffic count of each of its network ports is 0;

Then, server MSS-400 sends a device state query instruction to the port each second to check whether STB-0 works normally, when the server does not receive a state query response in 6 seconds, it will be considered that STB-0 has been removed from the network, and no device state query instruction will be sent any longer; instead, it continues to send a query packet to the current port.

Reaming to the above steps 6-14, BX-008-1 may also access the network and obtain its access network address as 0x0002; and STB-1 may also access the network and obtain its access network address as 0x0012.

3.4 Definition of Data Format During the Network Access Process:

The information interaction mode between the user terminal and the server is PDU, and both use Raw Socket to transfer PDU, the data format of which is as follows:

TABLE 1

| Destination Address | Source Address | Reserved Byte | PDU |
|---|---|---|---|
| 4 W | 4 W | 2 BYTE | 32 W or 528 W |

Definition of System Message (PDU)
Port Query Instruction: a 32 W short signaling issued by a server

TABLE 2

| Field Number | Length | Code | Description |
|---|---|---|---|
| 0 | 1 W | 8A01 | server port query instruction |
| 1-4 | 4 W | | network address |
| 5-7 | 3 W | | system clock |
| 8-9 | 2 W | | IP address of a gateway (this field is valid only for a terminal) |

TABLE 2-continued

| Field Number | Length | Code | Description |
|---|---|---|---|
| 10-12 | 3 W | | MAC address of a gateway (this field is valid only for a terminal) |
| 13-31 | 19 W | 0000 | padded |

Port Query Response Instruction: a 32 W short signaling

A response sent, by a set-top box, to a server after reception of 8A01.

TABLE 3

| Field Number | Length | Code | Description |
|---|---|---|---|
| 0 | 1 W | 8A03 | user terminal port query response instruction |
| 1 | 1 W | | device type (0x2131) |
| 2-4 | 3 W | | terminal device identification (different for each terminal) |
| 5-8 | 4 W | | network address (acquired from 8A01) |
| 9-11 | 3 W | 0000 | user number (filled with 0) |
| 12 | 1 W | 0000 | user extension number (filled with 0) |
| 13-15 | 3 W | | terminal version information (for identifying the location of a set-top box program on a server) |
| 16-31 | 16 W | 0000 | padded |

A response sent, by a switch, to a server after reception of 8A01

TABLE 4

| Field Number | Length | Code | Description |
|---|---|---|---|
| 0 | 1 W | 8A02 | switch port query response instruction |
| 1 | 1 W | | device type |
| 2-4 | 3 W | | device identification (different for each switch) |
| 5-8 | 4 W | | network address (acquired from 8A01) |
| 9 | 1 W | | rated traffic of backbone (inherent to a switch) |
| 10 | 1 W | | rated traffic of branch (inherent to a switch) |
| 11-13 | 3 W | | version information (inherent to a switch) |
| 14-31 | 18 W | 0000 | 0 padded |

A response sent, by a switch, to a code plate after reception of 8A01

TABLE 5

| Field Number | Length | Code | Description |
|---|---|---|---|
| 0 | 1 W | 8A06 | code plate port query response instruction |
| 1 | 1 W | | device type (0x5131) |
| 2-4 | 3 W | | device identification (different for each device) |
| 5-8 | 4 W | | network address (acquired from 8A01) |
| 9-31 | 23 W | 0000 | padded |

Device Identification: with a temporary value of 0x5131 0201 000X (X=0–f)

Network Access Instruction: a 32 W short signaling issued by a server

TABLE 6

| Field Number | Length | Code | Description |
|---|---|---|---|
| 0 | 1 W | 8A11 | server network access instruction |
| 1 | 1 W | | device type |
| 2-4 | 3 W | | device identification |
| 5-8 | 4 W | | network address |
| 9-11 | 3 W | | device number, user number |
| 12 | 1 W | | user extension number, or TWG-dedicated HOP NUMBER |
| 13-31 | 19 W | 0000 | padded |

Network Access Confirmation Instruction: a 32 W short signaling

TABLE 7

| Field Number | Length | Code | Description |
|---|---|---|---|
| 0 | 1 W | 8A12 | network access confirmation instruction |
| 1 | 1 W | | device type |
| 2-4 | 3 W | | device identification |
| 5-10 | 6 W | | device type auxiliary information, ASCII code) |
| 11-13 | 3 W | | user number (acquired from 8a11) |
| 14 | 1 W | | user extension number (acquired from 8a11) |
| 15-18 | 4 W | | network address (acquired from 8A01) |
| 19-31 | 13 W | 0000 | padded |

State Query Instruction: a 32 W short signaling issued by a server

State query instruction to a switch

TABLE 8

| Field Number | Length | Code | Description |
|---|---|---|---|
| 0 | 1 W | 8A21 | switch state query instruction |
| 1 | 1 W | | device type |
| 2-4 | 3 W | | device identification |
| 5-8 | 4 W | | network address |
| 9 | 1 W | | device number |
| 10-12 | 3 W | | real-time clock (maintained by a server) |
| 13-17 | 5 W | | padded |
| 18-19 | 2 W | | IP address (valid only for a gateway) |
| 20-22 | 3 W | | MAC address (valid only for a gateway) |
| 23 | 1 W | | MAC serial number (valid only for a gateway) |
| 24-31 | 8 W | | padded |

State query instruction to a set-top box

TABLE 9

| Field Number | Length | Code | Description |
|---|---|---|---|
| 0 | 1 W | 8A31 | set-top box state query instruction |
| 1-4 | 4 W | | network address |
| 5-7 | 3 W | | real-time clock (maintained by a server) |
| 8-10 | 3 W | | set-top box number |
| 11-31 | 21 W | 0000 | padded |

State Query Response instruction: a 32 W short signaling
State query response from a switch

TABLE 10

| Field Number | Length | Code | Description |
|---|---|---|---|
| 0 | 1 W | 8A22 | switch state query response instruction |
| 1 | 1 W | | device type |
| 2-4 | 3 W | | device identification |
| 5-6 | 2 W | | padded |
| 7 | 1 W | | device number |
| 8 | 1 W | | padded |
| 9 | 1 W | | working state of a switch |
| 10 | 1 W | | temperature |
| 11 | 1 W | | actually-measured uplink traffic of the backbone |
| 12 | 1 W | | actually-measured downlink traffic of the backbone |
| 13-31 | 19 W | | padded |

State query response from a set-top box

TABLE 11

| Field Number | Length | Code | Description |
|---|---|---|---|
| 0 | 1 W | 8A23 | user terminal state query response instruction |
| 1 | 1 W | | device type |
| 2-4 | 3 W | | device identification |
| 5-7 | 3 W | | user number |
| 8 | 1 W | | user terminal extension number |
| 9 | 1 W | | terminal device state (normal = 0) |
| 10 | 1 W | | ambient temperature of user terminal |
| 11 | 1 W | | type of a device connected to a terminal |

TABLE 11-continued

| Field Number | Length | Code | Description |
|---|---|---|---|
| 12 | 1 W | | on-off state of a device connected to a terminal 0 = powered off 1 = powered on |
| 13-30 | 18 W | | the same as 11-12 |
| 31 | 1 w | | CRC |

State query response from a code plate

TABLE 12

| Field Number | Length | Code | Description |
|---|---|---|---|
| 0 | 1 W | 8A26 | code plate state query instruction response |
| 1 | 1 W | | device type |
| 2-4 | 3 W | | device identification |
| 5-7 | 3 W | | device number |
| 8 | 1 W | | padded |
| 9 | 1 W | | code plate working state |

TABLE 12-continued

| Field Number | Length | Code | Description |
|---|---|---|---|
| 10 | 1 W | | code plate temperature |
| 11-31 | 21 W | | padded |

IV. Service Process of Access Network Device 4.1 An Example of the Communication Connection Process in which an Access Network Device Performs a Unicast Communication Service.

Reaming again to FIG. 8, it is assumed that there exists a node server MSS-400 (with an access network address of 0x0000), port 0 thereof is connected with an access switch BX-008-0 (with an access network address of 0x0000, port 1 thereof is connected with an access switch BX-008-1 (with an access network address of 0x0002), and port 0 of BX-008-0 is connected with a set-top box STB-0 (with an access network address of 0x0009), port 1 of BX__0081 is connected with a set-top box STB-1 (with an access network address of 0x0012). Set-top box STB__0 issues a request to node server MSS-400 for performing a unicast communication service of visual communication with set-top box STB__1, in the following steps:

1) Set-Top box STB__0 issues a service request protocol packet, the DA (destination address) of the packet is 0x0800 0x0000 0x0000 0x0000 (i.e., the address of MSS-400), and the SA (source address) is 0x0000 0x0000 0x0000 0x0009; the packet may further comprise reserved 0x0000 (reserved word), and the PDU part is as shown in the following table:

TABLE 13

| 8e01 Field Number | Length | Code | Description |
|---|---|---|---|
| 0 | 1 W | 8e01 | user request instruction (source terminal → node server) |
| 1 | 1 W | | service type (service_type) |
| 2-4 | 3 W | | user number (source terminal number) |
| 5 | 1 W | | user extension number (source terminal extension number) |
| 6-31 | 26 W | | service parameter (0 is added to an unoccupied part) |

The program number and the broadcast channel number related to the service request are both put in the service parameter, for example:
define SERVICE_TYPE_GTML_REQUEST 0x8000, requesting for a menu
define SERVICE_TYPE_VOD_REQUEST 0x8001, requesting for a VOD program
define SERVICE_TYPE_CHANGE_MENU 0x8002, requesting for changing background menu
define SERVICE_TYPE_BROADCAST_REQUEST 0x8003, requesting for watching broadcast
define SERVICE_TYPE_CHANGE_CHANNEL 0x8004, requesting for changing channel
define SERVICE_TYPE_TELEPHONE_DIRECT 0x8005, requesting for making a video call
define SERVICE_TYPE_PERMISSION 0x8006, a response of whether access is permitted
define SERVICE_TYPE_RECORD_REQUEST 0x8007, requesting for recording
define SERVICE_TYPE_END_REQUEST 0x8008, requesting for ending the current service define SERVICE_TYPE_ORG_CAST_REQUEST 0x8009, requesting for originating a living broadcast define SERVICE_TYPE_DDB_REQUEST 0x800b, requesting for watching delayed TV define SERVICE_TYPE_SKIP 0x800c, fast forward, fast rewind, pause and continue during the processing of watching a VOD or delayed TV define SERVICE_TYPE_RECORD_END 0x800e, requesting for ending recording define SERVICE_TYPE_VIEW_Monitor_DIRECT 0x8024, requesting for watching monitor define SERVICE_TYPE_RCV_CAST_DIRECT 0x8025, requesting for watching living broadcast define SERVICE_TYPE_TELEPHONE_REQUEST 0, requesting for making a video call define SERVICE_TYPE_RCV_CAST_REQUEST 0xa, requesting for watching living broadcast define SERVICE_TYPE_VIEW_Monitor 0xc, requesting for watching monitor

In this example, the service parameter is SERVICE_TYPE_TELEPHONE_REQUEST or SERVICE_TYPE_TELEPHONE_DIRECT.

2) According to the configuration of table 1 on access switch BX-008-0 connected between set-top box STB_0 and node server MSS-400, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to response;

Wherein, menu protocol packet sent to STB_0: DA is 0x8000 0x0000 0x0000 0x0009, SA is 0x0000 0x0000 0x0000 0x0000, reserved is 0x0000, and PDU part is as shown in the following table:

TABLE 14

| Field Number | Length | Code | Description |
|---|---|---|---|
| 0 | 1 W | 3900 | data download instruction |
| 1 | 1 W | | data type (0 = null, 1 = gtml 2 = gtmlfodder 3 = set-top box program 4 = start menu 5 = bmp 100 = dsp program on gateway 101 = dsp program of 008) |
| 2 | 1 W | | reserved |
| 3 | 1 W | | number of valid packets |
| 4 | 1 W | | sequence number of the current packet |
| 5 | 1 W | | length of valid data in the current packet |
| 6-14 | 9 W | | reserved |
| 15-526 | 512 W | | data |
| 527 | 1 W | | CRC (summarization of 512 data) | menu protocol packet sent to STB_1: DA is 0x8000 0x0000 0x0000 0x0012, SA is 0x0000 0x0000 0x0000 0x0000, reserved is 0x0000, and PDU part is as shown in the above table.

3) According to the configuration of table 0 on node server MSS-400 and the configuration of table 0 on access switches BX-008-0 and BX-008-1, these 2 menu protocol packets will be respectively oriented to set-top boxes STB_0 and STB_1, the called STB_1 issues a request SERVICE_TYPE_PERMISSION for accepting the communication from STB_1 and sends a response protocol packet to node server MSS-400, wherein DA the response protocol packet is 0x0800 0x0000 0x0000 0x0000, SA is 0x0000 0x0000 0x0000 0x0012, reserved is 0x0000, service parameter is SERVICE_TYPE_PERMISSION, and PDU part is as shown in the following table:

TABLE 15

| 8e01 Field Number | Length | Code | Description |
|---|---|---|---|
| 0 | 1 W | 8e01 | user request instruction (target terminal →node server) |
| 1 | 1 W | | service type (service_type) |
| 2-4 | 3 W | | user number (source terminal number) |
| 5 | 1 W | | user extension number (source terminal extension number) |
| 6-31 | 26 W | | service parameter (SERVICE_TYPE_PERMISSION) |

4) According to the configuration of table 1 on access switch BX-008-1, the response protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link, is permitted and communication may be established between the two parts.

In such a case, node server MSS-400 configures its own table 2 as follows:

"10 0000 0000 0001 0010"=>"000 0000 0010", i.e., a unicast data packet with a destination address (DA) of 0x1000 0x0000 0x0000 0x0012 (i.e., set-top box BX-008-1) is oriented to port 1;

"10 0000 0000 0000 1001"=>"000 0000 0001", i.e., a unicast data packet with a destination address (DA) of 0x1000 0x0000 0x0000 0x0009 (i.e., set-top box BX-008-0) is oriented to port 0;

Moreover, node server MSS-400 sends a port configuration command to all access switches on the uplink (the calling path) and the downlink (the called path), for requesting to open the uplink of the address of the opposite party and the downlink of the address of its own simultaneously.

The two packets sent to access switch BX-008-0:

i) the first packet: DA is 0x8000 0x0000 0x0000 0x0001, SA is 0x0000 0x0000 0x0000 0x0000, reserved is 0x0000, and PDU part is as shown in the following table:

TABLE 16

| 8b54 Field Number | Length | Code | Description |
|---|---|---|---|
| 0 | 1 W | 8b54 | port configuration command of access switch (node server →access switch) |
| 1 | 1 W | | device type (BX-008) |
| 2-5 | 4 W | | address of port to be opened: 0x1000 0x0000 0x0000 0x0012 |
| 6 | 1 W | | operation mode: "10 0000 0000", which represents that uplink port 9 is opened |
| 7-10 | 4 W | | 0000 |
| 11 | 1 W | | data type 0x10 |
| 12 | 1 W | | access switch address (access network address) 0x0001 |
| 13-15 | 3 W | | device flag of access switch |
| 16-31 | 18 W | | 0000 | ii) the second packet: DA is 0x8000 0x0000 0x0000 0x0001, SA is 0x0000 0x0000 0x0000 0x0000, reserved is 0x0000, and PDU part is as shown in the following table:

TABLE 17

| 8b54 Field Number | Length | Code | Description |
|---|---|---|---|
| 0 | 1 W | 8b54 | port configuration command of access switch (node server →access switch) |
| 1 | 1 W | | device type (BX-008) |
| 7-5 | 4 W | | address of port to be opened: 0x1000 0x0000 0x0000 0x0009 |
| 6 | 1 W | | operation mode: "00 0000 0001", which represents that port 0 is opened |
| 7-10 | 4 W | | 0000 |
| 11 | 1 W | | data type 0x10 |
| 12 | 1 W | | access switch address access network address) 0x0001 |
| 13-15 | 3 W | | device flag of access switch |
| 16-31 | 18 W | | 0000 |

Two packets sent to access switch BX-008-1:

i) the first packet: DA is 0x8000 0x0000 0x0000 0x0002, SA is 0x0000 0x0000 0x0000 0x0000, reserved is 0x0000, and PDU is as shown in the following table:

TABLE 18

| 8b54 Field Number | Length | Code | Description |
|---|---|---|---|
| 0 | 1 W | 8b54 | port configuration command of access switch (node server →access switch) |
| 1 | 1 W | | device type (BX-008) |
| 2-5 | 4 W | | address of port to be opened: 0x1000 0x0000 0x0000 0x0009 |
| 6 | 1 W | | operation mode: "10 0000 0000", which represents that uplink port 9 is opened |
| 7-10 | 4 W | | 0000 |
| 11 | 1 W | | data type 0x10 |
| 12 | 1 W | | access switch address (access network address) 0x0002 |
| 13-15 | 3 W | | device flag of access switch |
| 16-31 | 18 W | | 0000 | ii) the second packet: DA is 0x8000 0x0000 0x0000 0x0002, SA is 0x0000 0x0000 0x0000 0x0000, reserved is 0x0000, and PDU is as shown in the following table:

TABLE 19

| 8b54 Field Number | Length | Code | Description |
|---|---|---|---|
| 0 | 1 W | 8b54 | port configuration command of access switch (node server →access switch) |
| 1 | 1 W | | device type (BX-008) |
| 2-5 | 4 W | | address of port to be opened: 0x1000 0x0000 0x0000 0x0012 |
| 6 | 1 W | | operation mode: "00 0000 0010", which represents that port 1 is opened |
| 7-10 | 4 W | | 0000 |
| 11 | 1 W | | data type 0x10 |
| 12 | 1 W | | access switch address (access network address) 0x0002 |
| 13-15 | 3 W | | device flag of access switch |
| 16-31 | 18 W | | 0000 |

Packet sent to set-top box STB-0 (service processing command, and coding/decoding command in this example):

wherein, DA is 0x8000 0x0000 0x0000 0x0009, SA is 0x0000 0x0000 0x0000 0x0000, reserved is 0x0000, and PDU part is as shown in the following table:

TABLE 20

| 8704 Field Number | Length | Code | Description |
|---|---|---|---|
| 0 | 1 W | 8704 | coding/decoding command (node server →source terminal) |
| 1 | 1 W | | padded |
| 2-4 | 3 W | | padded |
| 5-7 | 3 W | | padded |
| 8 | 1 W | | padded |
| 9-11 | 3 W | | padded |
| 12 | 1 W | | padded |
| 13 | 1 W | | 0x3217 |
| 14 | 1 W | | 0x3217 |
| 15-18 | 4 W | | 0x1000 0x0000 0x0000 0x0012 |
| 19-22 | 4 W | | 0x1000 0x0000 0x0000 0x0009 |
| 23 | 1 W | | 0xffff = maintaining the original state |
| 24 | 1 w | | 0 = alarm shut down |
| 25 | 1 W | | 0xffff = maintaining the original state |
| 26 | 1 W | | 0xffff = maintaining the original state |
| 27-31 | 5 w | | 0 |

Packet sent to STB-1 (service processing command, and coding/decoding command in this example):

wherein, DA is 0x8000 0x0000 0x0000 0x0012, SA is 0x0000 0x0000 0x0000 0x0000, reserved is 0x0000, and PDU part is as shown in the following table:

TABLE 21

| 8704 Field Number | Length | Code | Description |
|---|---|---|---|
| 0 | 1 W | 8704 | coding/decoding command (node server →target terminal) |
| 1 | 1 W | | padded |
| 2-4 | 3 W | | padded |
| 5-7 | 3 W | | padded |
| 8 | 1 W | | padded |
| 9-11 | 3 W | | padded |
| 12 | 1 W | | padded |
| 13 | 1 W | | 0x3217 |
| 14 | 1 W | | 0x3217 |
| 15-18 | 4 W | | 0x1000 0x0000 0x0000 0x0009 |
| 19-22 | 4 W | | 0x1000 0x0000 0x0000 0x0012 |
| 23 | 1 W | | 0xffff = maintaining the original state |
| 24 | 1 w | | 0 = alarm shut down |
| 25 | 1 W | | 0xffff = maintaining the original state |

TABLE 21-continued

| 8704 Field Number | Length | Code | Description |
|---|---|---|---|
| 26 | 1 W | | 0xffff = maintaining the original state |
| 27-31 | 5 w | | 0 |

In the PDU of the above coding/decoding command, Field Number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: HB: coded HDA, LB: decoded HAD; 0xffff=maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

TABLE 22

| Code | Video Compression | Video System | Audio Compression | Traffic Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

5) According to the configuration of table 0 on node server MSS-400 and the configuration of table 0 on access switch BX-008-0 and BX-008-1, the above 4 packets sent to the access switch will be respectively oriented to BX-008-0 and BX-008-1.

In such a case, access switch BX-008-0 configures its own table 2 as follows:

"10 0000 0000 0001 0010"=>"10 0000 0000", i.e., a unicast data packet with a destination address (DA) of 0x1000 0x0000 0x0000 0x0012 is oriented to port 9;

"10 0000 0000 0000 1001"=>"00 0000 0001", i.e., a unicast data packet with a destination address (DA) of 0x1.000 0x0000 0x0000 0x0009 is oriented to port 0;

Access switch BX-008-1 configures its own table 2 as follows:

"10 0000 0000 0001 0010"=>"00 0000 0010", i.e., a unicast data packet with a destination address (DA) of 0x1000 0x0000 0x0000 0x0012 is oriented to port 1;

"10 0000 0000 0000 1001"=>"10 0000 0000", i.e., a unicast data packet with a destination address (DA) of 0x1000 0x0000 0x0000 0x0009 is oriented to port 9;

According to the configuration of table 0 on node server MSS-400 and the configuration of table 0 on access switch BX-008-0 and BX-008-1, the latter 2 packets sent to the set-top box will be respectively oriented to set-top boxes STB-0 and STB-1. After receiving the packet, set-top boxes STB-0 and STB-1 may start coding/decoding according to the content of the packet, and receive and send unicast data.

It illustrates in detail above a process in which node server MSS-400 sends a protocol packet and completes table configuration, and notifies each access switch on the communication link of the current service to open the corresponding port. Preferably, in the communication route setting process for the current service, the node server MSS-400 may also realize the transfer of traffic control information by sending a protocol packet, that is, it sends the traffic control information for the current service to the first access switch BX-008-0 on the uplink from set-top box STB-0 to set-top box STB-1, and access switch BX-008-0 performs traffic control on the data of the current service.

Because when node server MSS-400 sets a route for the current service, it determines the traffic occupied by the current service (i.e., the traffic allocated to the current service) according to the attribute information of the current service, such as type and so on at the same time, and records it in the device resource description information in the address information table of node server MSS-400 (i.e., the traffic occupied by the current service is added to the traffic information of the port). Thus, at the time the next service request is issued, it may know the actual traffic of the port by looking up in the address information table.

The reason that node server MSS-400 sends traffic control information to switch BX-008-0 is to ensure that the traffic limit allocated to the current service by the node server MSS-400 can be guaranteedly followed, rather than randomly increasing or reducing (including the change in the sense of bandwidth statistics and the change of bandwidth on discrete time points).

Traffic control information may guarantee that a packet may be sent according to a certain time interval when switch BX-008-0 receives a data packet of the current service, and a requirement is also laid on the size of data sent each time. When the length of a data packet sent by the terminal is large, two or more time intervals may be accumulated for sending the packet, thus the user data packet may not be dismantled or disassembled, and at the same time, it can also guarantee the stability and uniformity of data transmission basically. However, in the invention, preferably, the switch and the terminal may be notified to limit the packet length when a service is established, for example, the length of the packet initiated by a terminal will meet the requirement of traffic control information, and at the same time, the switch may also discard a data packet that does not meet the data packet length requirement, thus the stability and uniformity of data transmission may be further guaranteed.

In a word, it may guarantee via traffic control information that the data stream sent by switch BX-008-0 at each moment is stable and uniform and meet the traffic limit allocated, and it will not be changed at random. Thus, it can guarantee that accurate traffic allocation and control on each service and each port of the network may be realized in the invention.

However, in the invention, in order to guarantee accurate traffic control, traffic control may also be performed on a protocol packet for requesting a service. Specifically, node server MSS-400 may assign traffic control information to bottom-layer switches of an access terminal, that is, when each switch receives an uplink protocol packet, it only needs to perform data transmission according to the traffic control information informed by node server MSS-400 when the current switch is powered on and accesses the network. Thus, the invention may guarantee that the traffic distribution of the whole network will not be influenced even if a large amount of service request protocol packets are initiated at the same time; that is, the invention can perform traffic control on the service request process, and it can also perform traffic control on the data transmission process in which a service link has been established.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein DA of the packet is 0x1000 0x0000 0x0000x0012, and SA is 0x0000 0x0000 0x0000 0x0009;

2) The unicast data packet enters access switch BX-008-0, and the switching engine module of access switch BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x1000 0x0000 0x0000 0x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x1000 0x0000 0x0000 0x0012 is oriented to port 1), which represents that downlink port 1 is opened, and the current unicast data packet enters access switch BX-008-1 via port 1;

4) After access switch BX-008-1 receives the unicast data packet, its switching engine module looks up in table 2 according to a combined address field, wherein the table address is "10 0000 0000 0001 0010", the output of the item is "00 0000 0010" ("10 0000 0000 0001 0010"=>"00 0000 0010", i.e., a unicast data packet with a destination address (DA) of 0x1000 0x0000 0x0000 0x0012 is oriented to port 1) which represents that downlink port 1 is opened, and the current unicast data packet enters set-top box STB-1 via port 1;

5) Set-top box STB-1 sends a unicast data packet to set-top box STB-0, wherein DA of the packet is 0x1000 0x0000 0x0000 0x0009, and SA is 0x0000 0x0000 0x0000 0x0012;

6) The unicast data packet enters access switch BX-008-1, and the switching engine module of access switch BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e., a unicast data packet with a destination address (DA) of 0x1000 0x0000 0x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x1000 0x0000 0x0000 0x0009 is oriented to port 0), which represents that downlink port 0 is opened, and the current unicast data packet enters access switch BX-008-0 via port 0;

8) After access switch BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x1000 0x0000 0x0000 0x0009 is oriented to port 0), which represents that downlink port 0 is opened, and the current unicast data packet enters set-top box STB-0 via port 0.

An simple example in which unicast service communication is realized in the above process is as follows:

It is assumed that STB-0 requests to server MSS-400 for sending a videophone to STB-1, and the service request packet sent by STB-0 to MSS-400 contains the type of the service requested (which is videophone in this example, so it contains the number of the opposite party, for example, 8888 8888 8888)

After server MSS-400 receives the service request packet, it checks the service type and knows that the service type is videophone, and then it skips to the videophone service process; according to the number of the opposite party (8888 8888 8888), server MSS-400 may obtain the access network address of STB-1 (because at the time STB-1 accesses the network, server MSS-400 will update the content of CAM and update address 0x0012 to 8888 8888 8888) by looking up in the CAM; the topology information of STB-0 and STB-1 may be known by looking up in the address information table according to the access network address of STB-0 and STB-1, and from 0x0009, it may be know that STB-0 is connected with Port 0 of BX-008-0, and the uplink and downlink traffic is 0, the link traffic is 100 Mbit/s; the access network address of BX-008-0 is 0x0001, and it may be known by looking up in the address information table that BX-008-0 is connected with port 0 of MSS-400, the uplink and downlink traffic is 0, and the link traffic is 100 Mbit/s; the link traffic information of STB-1 may be known by the same token, and the uplink and downlink bandwidth that requests for videophone is 2 Mbit/s, which meets the requirement; and then other information is checked, if it meets the requirement, the server opens the paths directed to said 2 paths of unicast data of all switches between the called set-top box and the calling set-top box (including address matching and accurate traffic control on Port 0 of BX-008-0 and Port 1 of BX-008-1), the link traffic information for looking up in the address information table is modified, and the server sends a coding/decoding command to the two parties of set-top boxes.

4.1.2 An Example of the Communication Connection Process in which an Access Network Device Performs Multicast Communication Service:

Referring again to FIG. 8, it is assumed that there exists a node server MSS-400 (with an access network address of 0x0000), and port 0 thereof is connected with an access switch BX-008-0 (with an access network address of 0x0001), port 1 thereof is connected with an access switch BX-008-1 (with an access network address of 0x0002), and port 0 of BX-008-0 is connected with a set-top box STB-0 (with an access network address of 0x0009), the number of STB_0 is 0x6666 0x6666 0x6666, port 1 of BX 008-1 is connected with a set-top box STB-1 (with an access network address of 0x0012), and the number of STB_1 is 0x8888 0x8888 0x8888. Set-top box STB_0 requests to node server MSS-400 for initiating living broadcast in the following steps:

1) Set-top box STB_0 issues a service request protocol packet for initiating living broadcast, wherein DA of the packet is 0x0800 0x0000 0x0000 0x0000, SA is 0x0000 0x0000 0x0000 0x0009, reserved is 0x0000 (reserved word), and the PDU part is as shown in the following table:

TABLE 23

8e01

| Field Number | Length | Code | Description |
|---|---|---|---|
| 0 | 1 W | 8e01 | terminal request instruction (terminal →node server) |
| 1 | 1 W | | service type (service_type) |
| 2-4 | 3 W | | terminal number (number of reqestor) 0000 |
| 5 | 1 W | | terminal extension number (extension number of requestor) 0000 |
| 6-31 | 26 W | | #define SERVICE_TYPE_ORG_CAST_REQUEST 0x8009, requesting for originating a living broadcast |

2) According to the configuration of table 1 on access switch BX-008-0 connected between set-top box STB_0 and node server MSS-400, the service request protocol packet is oriented to node server MSS-400, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, and knows the link topology related to the current service according to its internal address information table, and it determines that the link is permitted and living broadcast may be initiated, then it allocates a multicast address of 0x0008. Moreover, the node server sends a port configuration command to all access switches on the current communication link for requesting to open the uplink of the address of the opposite party and the downlink of the address of its own simultaneously. At this point, it knows that only access switch BX-008-0 needs to be configured at present by link topology determination.

In such a case, the node server MSS-400 sends a packet to access switch BX-008-0:

wherein, DA is 0x8000 0x0000 0x0000 0x0001, SA is 0x0000 0x0000 0x0000 0x0000, reserved is 0x0000 (reserved word), and the PDU part is as shown in the following table:

TABLE 24

8b54

| Field Number | Length | Code | Description |
|---|---|---|---|
| 0 | 1 W | 8b54 | port configuration command of access switch (node server →access switch) |
| 1 | 1 W | | device type (BX-008) |
| 2-5 | 4 W | | 0x7800 0x0000 0x0000 0x0008 |
| 6 | 1 W | | "00 0000 0001", which represents that port 0 is opened 0000 |
| 7-10 | 4 W | | |
| 11 | 1 W | | data type 0x78 |
| 12 | 1 W | | access switch address (access network address) 0x0001 |
| 13-15 | 3 W | | device flag of access switch |
| 16-31 | 18 W | | 0000 |

Node server MSS-400 sends a packet to set-top box STB-0 (service processing command, and coding/decoding command in this example):

wherein, DA is 0x8000 0x0000 0x0000 0x0009, SA is 0x0000 0x0000 0x0000 0x0000, reserved is 0x0000, and PDU part is as shown in the following table:

TABLE 25

8704

| Field Number | Length | Code | Description |
|---|---|---|---|
| 0 | 1 W | 8704 | coding/decoding command (node server →set-top box) |
| 1 | 1 W | | padded |
| 2-4 | 3 W | | padded |
| 5-7 | 3 W | | padded |
| 8 | 1 W | | padded |
| 9-11 | 3 W | | padded |
| 12 | 1 W | | padded |
| 13 | 1 W | | 0x3217 |
| 14 | 1 W | | 0x3217 |
| 15-18 | 4 W | | 0x7800 0x0000 0x0000 0x0008 |
| 19-22 | 4 W | | 0x7800 0x0000 0x0000 0x0008 |
| 23 | 1 W | | 0xffff = maintaining the original state |
| 24 | 1 w | | 0 = alarm shut down |
| 25 | 1 W | | 0xffff = maintaining the original state |
| 26 | 1 W | | 0xffff = maintaining the original state |
| 27-31 | 5 w | | 0 |

3) According to the configuration of table 0 on node server MSS-400, the packet sent to access switch BX-008-0 will be oriented to BX-008-0. In such a case, BX-008-0 configures its own table 3 as follows:

"11 0000 0000 0000 1000"=>"00 0000 0001", i.e., a multicast data packet with a destination address (DA) of 0x7800 0x0000 0x0000 0x0008 is oriented to port 0;

4) According to the configuration of table 0 on node server MSS-400 and the configuration of table 0 on access switch BX-008-0, the packet sent to set-top box STB-0 will be oriented to STB-0. STB-0 starts coding/decoding according to the content of the packet, and starts receiving and sending multicast data.

In the multicast link establishment process, it also relates to the setting, recording and notifying of traffic control information of a port in the above unicast service, and the implementation process and the technical theory are basically the same, so it will not be described again here.

Specifically, the process in which set-top box STB-0 initiates a communication link to receive and send multicast data based on the current living broadcast is as follows:

1) Set-top box STB-0 issues a multicast data packet, wherein DA of the packet is 0x7800 0x0000 0x0000 0x0008 (multicast address), and SA is 0x0000 0x0000 0x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "00 0000 0001" ("11 0000 0000 0000 1000"=>"00 0000 0001", i.e., a multicast data packet with a destination address (DA) of 0x7800 0x0000 0x0000 0x0008 is oriented to port 0), which represents that downlink port 0 is opened, and the current multicast data packet enters set-top box STB-0 via port 0.

Set-top box STB_1 requests to node server MSS-400 for watching living broadcast in the following steps, with a number of 0x6666 0x6666 0x6666:

S1) Set-top box STB_1 issues a service request protocol packet for watching living broadcast, wherein DA of the packet is 0x08000×0000 0x00000x0000, SA is 0x0000 0x0000 0x0000 0x0012, reserved is 0x0000, and PDU part is as shown in the following table:

TABLE 26

8e01

| Field Number | Length | Code | Description |
|---|---|---|---|
| 0 | 1 W | 8e01 | user request instruction (terminal →node server) |
| 1 | 1 W | | service type (service type) |
| 2-4 | 3 W | | terminal number (number of requestor) 0x6666 0x6666 0x6666 |
| 5 | 1 W | | terminal extension number (extension number of requestor) 0000 |
| 6-31 | 26 W | | #define SERVICE_TYPE_RCV_CAST_DIRECT 0x8025, requesting for watching living broadcast |

S2) According to the configuration of table 1 on access switch BX-008-1 connected between set-top box STB_1 and node server MSS-400, the service request protocol packet is oriented to node server MSS-400, and node server MSS-400 determines that a request tier watching living broadcast is received according to the content of the packet, knows that the initiator (source terminal) is STB_0 by looking up in a CAM table according to the service number, and knows the link topology related to the current service according to its internal address information table, and it determines that the link is permitted and living broadcast may be watched, then it allocates a multicast address (corresponding to the multicast address allocated to the source terminal) of 0x0008. Moreover, the node server sends a port configuration command to all access switches on the current communication link for requesting to open the uplink of the address of the opposite party and the downlink of the address of its own simultaneously. In such a case, node server MSS-400 configures its own table 3 as follows:

"11 0000 0000 0000 1000"=>"000 0000 0010", i.e., a multicast data packet with a destination address (DA) of 0x78000x0000 0x0000 0x0008 is oriented to port 1;

At the same time, node server MSS-400 sends a packet to access switch BX-008-0:

wherein, DA is 0x8000 0x0000 0x00000x0001, SA is 0x0000 0x0000 0x0000 0x0000, reserved is 0x0000, and PDU part is as shown in the following table:

TABLE 27

8b54

| Field Number | Length | Code | Description |
|---|---|---|---|
| 0 | 1 W | 8b54 | port configuration command of access switch (node server →access switch) |
| 1 | 1 W | | device type (BX-008) |
| 2-5 | 4 W | | 0x7800 0x0000 0x0000 0x0008 |
| 6 | 1 W | | "10 0000 0001", which represents that port 9 is opened |
| 7-10 | 4 W | | 0000 |
| 11 | 1 W | | data type 0x78 |
| 12 | 1 W | | access switch address (access network address) 0x0001 |
| 13-15 | 3 W | | device flag of access switch |
| 16-31 | 18 W | | 0000 |

At the same time, node server MSS-400 sends a packet to access switch BX-008-1:

Wherein, DA is DA is 0x8000 0x0000 0x0000 0x0002, SA is 0x0000 0x0000 0x0000 0x0000, reserved is 0x0000, and PDU part is as shown in the following table:

TABLE 28

8b54

| Field Number | Length | Code | Description |
|---|---|---|---|
| 0 | 1 W | 8b54 | port configuration command of access switch (node server →access switch) |
| 1 | 1 W | | device type (BX-008) |
| 7-5 | 4 W | | 0x7800 0x0000 0x0000 0x0008 |
| 6 | 1 W | | "00 0000 0010" represents port 1 |
| 7-10 | 4 W | | 0000 |
| 11 | 1 W | | data type 0x78 |
| 12 | 1 W | | access switch address (access network address) 0x0002 |
| 13-15 | 3 W | | device flag of access switch |
| 16-31 | 18 W | | 0000 |

At the same time, node server MSS-400 sends a packet to set-top box STB-1:

Wherein, DA is DA is 0x8000 0x0000 0x0000 0x0012, SA is 0x0000 0x0000 0x0000 0x0000, reserved is 0x0000, and PDU part is as shown in the following table:

TABLE 29

8704

| Field Number | Length | Code | Description |
|---|---|---|---|
| 0 | 1 W | 8704 | coding/decoding command (node server →terminal) |
| 1 | 1 W | | padded |
| 2-4 | 3 W | | padded |
| 5-7 | 3 W | | padded |
| 8 | 1 W | | padded |
| 9-11 | 3 W | | padded |
| 12 | 1 W | | padded |
| 13 | 1 W | | 0 |
| 14 | 1 W | | 0x3717 |
| 15-18 | 4 W | | 0xffff |
| 19-22 | 4 W | | 0x7800 0x0000 0x0000 0x0008 |
| 23 | 1 W | | 0xffff = maintaining the original state |
| 24 | 1 w | | 0 = alarm shut down |
| 25 | 1 W | | 0xffff = maintaining the original state |
| 26 | 1 W | | 0xffff = maintaining the original state |
| 27-31 | 5 w | | 0 |

S3) According to the configuration of table 0 on node server MSS-400, the packets sent to access switches BX-008-0 and BX-008-1 will be respectively oriented to access switches BX-008-0 and BX-008-1.

In such a case, access switch BX-008-0 configures its own table 3 as follows:

"11 0000 0000 0000 1000"=>"10 0000 0001", i.e., a multicast data packet with a destination address (DA) of 0x7800 0x0000 0x00000x0008 is oriented to port 0 and port 9;

Access switch BX-008-1 configures its own table 3 as follows:

"11 0000 0000 0000 1000"=>"00 0000 0010", i.e., a multicast data packet with a destination address (DA) of 0x7800 0x0000 0x0000 0x0008 is oriented to port 1;

S4) According to the configuration of table 0 on node server MSS-400 and the configuration of table 0 on access switch BX-008-1, the packet sent to set-top box STB-1 will be oriented to STB-1. STB-1 receives multicast data and decodes the data according to the content of the packet.

Specifically, the process in which set-top box STB-1 receives multicast data based on the current communication link on which living broadcast is watched is as follows:

1) Set-top box STB-0 issues a multicast data packet, wherein DA of the packet is 0x7800 0x0000 0x00000x0008 (multicast address), and SA is 0x0000 0x0000 0x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "10 0000 0001" ("11 0000 0000 0000 1000"=>"10 0000 0001", i.e., a multicast data packet with a destination address (DA) of 0x7800 0x0000 0x0000 0x0008 is oriented to port 0 and port 9), which represents that downlink port 0 and uplink port 9 are opened, and the current multicast data packet enters set-top box STB-0 via port 0, and enters node server MSS-400 via port 9;

3) After node server MSS-400 receives the multicast data packet, its switching engine module looks up in table 3 according to a combined address field, wherein the table address is "11 0000 0000 0000 1000", the output of the item is "000 0000 0010" ("11 0000 0000 0000 1000"=>"000 0000 0010", i.e., a multicast data packet with a destination address (DA) of 0x7800 0x0000 0x00000x0008 is oriented to port 1), and the current multicast data packet enters access switch BX-008-1 via port 1;

4) After access switch BX-008-1 receives the multicast data packet, its switching engine module looks up in table 3 according to a combined address field, wherein the table address is "11 0000 0000 0000 1000", the output of the item is "00 0000 0010" ("11 0000 0000 0000 1000"=>"00 0000 0010", i.e., a multicast data packet with a destination address (DA) of 0x7800 0x0000 0x0000 0x0008 is oriented to port 1), which represents that downlink port 1 is opened, and the current multicast data packet enters set-top box STB-1 via port 1.

However, the above unicast service communication process and multicast service communication process are only examples. In practice, it is feasible to perform any unicast service communication or multicast service communication by employing the embodiments of the invention.

In conjunction with the above content, the advantages of the embodiments of the invention will be further described below by comparing with IP Internet:

1) Impersonation may be prevented fundamentally on network address structure,

A user device informs the network of its IP Internet address; but in the invention, the network informs the user device of the communication network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the communication network of the invention, the address of a terminal is learnt via network management protocol, and the user terminal can only access the communication network of the invention via this address that is learnt. Therefore, accuracy can be ensured without authentication. A detailed description thereof may refer to network management protocol. The communication network of the invention creates a "colored" address system with an ordered structure (D/SCAF). The communication network address of the invention not only has uniqueness, but also has a function of being locatable and characterizable; for example, similar to ID card number, it implies the geographic position of user port, device attribute, service right and other characteristics. A switch on the communication network of the invention specifies a rule of conduct for the packets according to these characteristics, thus data distribution with different attribute may be realized.

2) An independent passport is issued for each service, so that the path for hacker attack and virus diffusion can be blocked.

A user can enter and exit the IP Internet freely, and a user prepares a firewall by himself/herself; but in the communication network of the invention, a passport must be requested for each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the communication network of the invention, after a user accesses the network, the network switch only allows the user to issue limited service requests to a node server, and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user:

Authentication of user packet source address: it can prevent a user from sending any imitated or anonymous packet (which is automatically set after network access);

Authentication of destination address: a user can only send a packet to an object designated by the server (which is determined during service request);

Authentication of data traffic: data traffic sent by a user must meet a specification of the server (which is determined during service request);

Authentication of copyright identification: it prevents a user from forwarding a content with a copyright that is downloaded from the network (which is set by a content provider);

Passive measures such as firewall, antivirus, encryption and isolation between internet and intranet, etc., will not be needed on the communication network of the invention, and the communication network of the invention blocks the approach of hacker attack and virus diffusion on the network structure. Therefore, it may be a secure network essentially.

3) Network device and user data are completely isolated, thus the lifeline of virus and Trojan can be cut off.

An IP Internet device may dismantle a user packet freely; but the communication network device of the invention is completely isolated from the user data.

The computer created by Von Neumann puts program instructions and operating data in the same place, that is, a segment of program may modify other programs and data in the machine. Such a computer mode still in use today gives an opportunity to Trojan, worm, virus and backdoor, etc. With the rapid accumulation of virus, antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the communication network of the invention, it is impossible for the CPUs of all servers and switch devices to touch the user packet of any user. That is, the whole communication network of the invention only establishes a transparent pipeline with specified traffic and behaviors, which is completely isolated, between the terminal devices of the service-providing party and the service-receiving party. Whatever data are received or sent by a user terminal, it has nothing to do with the network. The lifeline of virus and Trojan is cut off on the structure. Therefore, an end may be put to the possibility of stealing user data on the network; by the same token, those who attempts to be a hacker or make a virus will have no object to attack.

4) Free connection between users are completely isolated, so that effective management may be ensured.

IP Internet is a free market and has no middleman; the communication network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the communication network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5) Commercial rules are implanted into the communication protocol to ensure a profit-gaining mode;

IP Internet follows a mode of communication first; while the communication network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the communication network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the communication network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

Each embodiment in the specification is described in a stepped forward mode, and each embodiment emphasizes on the difference with other embodiments, and the same or similar parts between the embodiments may refer to each other. For the system embodiments, because basically they are similar to the method embodiments, the description thereof is relatively simple, and reference may be made to the related parts of the description on the method embodiments.

Finally, it should be noted that, in this specification, relation terms such as first, second and so on are only used to distinguish one entity or operation from another entity or operation, rather than requiring or implying that such an actual relation or sequence exists between these entities or operations.

A traffic control-based data transmission method, a traffic control-based switch, a node server and a traffic control-based communication system have been described in detail above. Theories and embodiments of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

The invention claimed is:

1. A traffic control-based data transmission method, comprising:

obtaining, by a switch, a traffic control information for each service request, wherein the traffic control information includes sending time interval and sending data size;

receiving, by the switch, a data packet, checking the data packet received, allocating a corresponding stream identifier and putting the packet data into a corresponding port receive buffer if the data packet meets a check requirement, wherein the checking comprises: checking whether destination address, source address, data packet type and packet length of the data packet meet the check requirement;

putting the data packet into a packet buffer queue, wherein putting the data packet into the packet buffer queue is: reading the data packet from the port receive buffer, and putting the data packet into a packet buffer queue of a stream corresponding to the stream identifier; and polling, by the switch, the packet buffer queue, and taking a data packet from the packet buffer queue for sending according to the traffic control information;

wherein the method further comprises:

generating, by a node server with a centralized control function in a novel network, the check requirement for a service according to a service request protocol packet initiated by a terminal, wherein the novel network is consisted of a node server with a centralized control function, a switch connected with the node server and a terminal connected with the switch; and sending, by the node server, the check requirement for the service to a switch for traffic control on uplink;

the method further comprises:

generating a sending token according to the traffic control information, wherein the sending token contains the stream identifier;

wherein, taking a data packet from the packet buffer queue for sending according to the traffic control information comprises:

sequentially reading a data packet from the packet buffer queue of the stream corresponding to the stream identifier in the sending token, and putting the data packet into a port send buffer; and reading the data packet from the port send buffer and sending the data packet;

wherein obtaining the traffic control information for each service request by a switch comprises:

generating, by a node server with a centralized control function in a novel network, the traffic control information according to a service request protocol packet initiated by a terminal; and sending, by the node server, the traffic control information for a service to a switch for traffic control on uplink, wherein the switch for traffic control is a first switch of the terminal accessed;

wherein, generating the traffic control information by the node server comprises:

checking, by the node server, whether traffic resource remained on uplink and downlink for a service both meet the traffic resource required by the service, and if Yes, generating the traffic control information corresponding to the service; otherwise, rejecting the service request;

before the checking, the method further comprises:

maintaining, by the node server, an address information table, in which address occupation information in novel network, device description information and device resource description information are recorded, wherein the device resource description information includes a novel network address of an access network device connected to respective network port of a device and an uplink and downlink traffic count on each network port of the device;

obtaining, by the node server, the uplink and downlink corresponding to the service according to the novel network address of the access network device connected to respective network port of the device in the address information table, and obtaining the traffic resource remained on the uplink and downlink for the service according to the uplink and downlink traffic count on each network port of the device;

wherein, the maintaining comprises:

initializing the address information table when the node server is powered on, wherein the initializing comprises:

filling the novel network address of the node server in a blank item of the address information table, and marking the address occupation information as used;

filling the device description information as the node server; and filling the device resource description information as port information of the node server:

wherein, the maintaining further comprises:

updating the address information table according to a setting of a downlink port to which each downlink protocol packet is to be oriented in an internal downlink protocol packet address table of the node server, wherein the updating comprises:

filling an access network address to be allocated in each downlink protocol packet respectively into a blank item of the address information table, and marking the address occupation information as standby;

wherein, the maintaining further comprises:

updating the address information table according to a setting of a downlink port of other access device to which a port downlink protocol packet is to be oriented, wherein the updating comprises:

filling an access network address to be allocated in each port downlink protocol packet respectively into a blank item of the address information table, and marking the address occupation information as standby;

wherein, the maintaining further comprises:

updating the address information table when the node server receives a network access command response sent by a switch, wherein the updating comprises:

marking the address occupation information in an item corresponding to the novel network address of the switch as used;

updating the device description information as the switch; and updating the device resource description information as port information of the switch and novel network address information of an access network device connected to a port of the switch;

wherein, the maintaining further comprises:

updating the address information table when the node server receives a network access command response sent by a terminal, wherein the updating comprises:

marking the address occupation information in an item corresponding to the novel network address of the terminal as used;

updating the device description information as the terminal; and updating the device resource description information as port information of the terminal and the novel network address of an access network device connected to a port of the terminal.

2. The method of claim 1, wherein, the data packet is an uplink data packet.

3. The method of claim 2, wherein, before sequentially reading a data packet from the packet buffer queue of the stream corresponding to the stream identifier in the sending token and putting the data packet into a port send buffer, the method further comprises:

determining whether following two conditions are met:
1) the port send buffer is not full;
2) a count of a packet counter in the packet buffer queue of the stream is larger than 0; and
sequentially reading the data packet from the packet buffer queue of the stream corresponding to the stream identifier in the sending token, and putting the data packet into the port send buffer, when the two conditions are met.

4. The method of claim 1, further comprising:
sending, by the node server, a transmission path configuration information to all switches on the uplink and downlink if the traffic resource remained on the uplink and downlink for the service both meet the traffic resource required by the service, and setting, by all the switches, their respective data packet address tables according to the transmission path configuration information;
wherein, when there exist a plurality of uplinks or downlinks for the service, if the traffic resource remained on one uplink or downlink thereof does not meet the traffic resource required by the service, the node server continues to check whether the traffic resource remained on other uplinks or downlinks meet the traffic resource required by the service, if Yes, the node server generates a traffic control information corresponding to the service and sends a transmission path configuration information to all switches on the uplink and downlink, and all the switches set their respective data packet address tables according to the transmission path configuration information;
wherein, if the node server obtains a plurality of uplinks or downlinks that meet the service, the node server selects one therefrom according to a preset rule;
wherein, the preset rule is as follows: the node server acquires the traffic information of each link and the traffic information of the service, and determines a communication link with a minimum traffic used as the communication link of the service; or
the preset rule is as follows: the node server acquires bandwidth information of each link and the bandwidth information of the service, and determines a communication link with a maximum bandwidth as the communication link of the service.

5. The method of claim 4, wherein, after receiving a data packet and before putting the data packet into a packet buffer queue, the method further comprises:
querying a data packet address table, and obtaining transmission orientation information of a data packet;
then, taking a packet from the packet buffer queue for sending is: sending according to the transmission orientation information of the data packet;
wherein, the data packet address table includes a unitcast data packet address table and a multicast data packet address table, for orienting a unitcast data packet and a multicast data packet respectively.

6. The method of claim 1, further comprising:
receiving, by a switch for traffic control, a service request protocol packet, and checking destination address, source address, data packet type and packet length of the service request protocol packet, if a check requirement is met, the service request protocol packet is put into a corresponding port receive buffer;
reading a protocol packet from the port receive buffer, and putting the protocol packet into a corresponding packet buffer queue;
polling the packet buffer queue, and sequentially reading a protocol packet from the packet buffer queue at a predefined time interval and putting the protocol packet into a port send buffer if the port send buffer is not full and a count of a packet counter in the packet buffer queue is larger than 0; and
reading a protocol packet from the port send buffer and sending the protocol packet.

7. A traffic control-based communication system, comprising a node server, a switch for traffic control and a terminal in a novel network, wherein:
the novel network is consisted of the node server with a centralized control function, the switch connected with the node server and the terminal connected with a switch, the node server comprises:
a traffic control information generating module, for generating a traffic control information for each service request, wherein the traffic control information includes sending time interval and sending data size; and
a traffic control information sending module, for sending the traffic control information for a service to a switch for traffic control;
a packet check requirement generating module, for generating a data packet check requirement for the service according to a service request protocol packet initiated by a terminal; and
a packet check requirement sending module, for sending the data packet check requirement for the service to a switch for traffic control;
the node server further comprises:
an address information table, for recording novel network address occupation information, device description information and device resource description information, wherein the device resource description information includes a novel network address of an access network device connected to respective network port of the device and an uplink and downlink traffic count on each network port of the device;
a transmission path acquiring module, for looking up the novel network address of an access network device connected to respective network port of the device in the address information table according to a service request protocol packet initiated by a terminal, and obtaining an uplink path and a downlink path corresponding to the service; and
a traffic calculating module, for obtaining the traffic resource remained on the uplink and downlink for the service according to the uplink and downlink traffic count on each network port of the device in the address information table;
a traffic control module, for checking whether the traffic resource remained on the uplink and downlink for the service both meet the traffic resource required by the service, and if Yes, triggering the traffic control information generating module to generate a traffic control information corresponding to the service; otherwise, rejecting the service request;
the switch for traffic control comprises:
a CPU module, for obtaining a traffic control information for each service request from the node server;
a packet checking module, for checking a data packet received, allocating, if the data packet meets a check requirement, a corresponding stream identifier and putting the data packet into a corresponding port receive buffer on the first network interface; wherein the packet checking module checks whether the destination address, the source address, the data packet type and the packet length of the data packet meet a requirement;
a packet buffer, for storing a data packet;

a first network interface, for receiving a data packet;
a second network interface, for sending a data packet; wherein the first network interface and the second network interface respectively comprise at least one port, and each port is configured with a port receive buffer and a port send buffer, respectively for storing a data packet received and a data packet to be sent; and
a switching engine, for putting a data packet received by the first network interface into a packet buffer queue, polling the packet buffer queue, and taking a packet from the packet buffer queue according to the traffic control information and sending the packet via the second network interface; the switching engine reads a data packet from the port receive buffer on the first network interface, and puts the data packet into a packet buffer queue of the stream corresponding to the stream identifier;
the switch for traffic control further comprises:
a code rate control module, which is configured by a CPU module, for generating a sending token according to the traffic control information and sending the sending token to the switching engine, wherein the token contains a stream identifier;
wherein, the switching engine obtains a sending token from the code rate control module, sequentially reads a data packet from the packet buffer queue of the stream corresponding to the stream identifier in the sending token, and puts the data packet into a port send buffer on the second network interface; and
the second network interface reads the data packet from the port send buffer and sends the data packet;
a terminal, for initiating a service request to the node server, and transmitting a data packet for the service;
wherein, the node server further comprises:
an address information table initializing module, for initializing the address information table when the node server is powered on, wherein the initialization operation comprises: filling the novel network address of the node server in a blank item of the address information table, and marking the address occupation information as used; filling the device description information as the current node server; and filling the device resource description information as port information of the current node server;
the node server further comprises:
an address information table updating module, for updating the address information table according to the setting of a downlink port to which each downlink protocol packet is to be oriented in an internal downlink protocol packet address table of the node server, wherein the updating comprises: filling an access network address to be allocated in each downlink protocol packet respectively into a blank item of the address information table, and marking the address occupation information as standby;
wherein, the address information table updating module is further configured to update the address information table according to the setting of a downlink port of other access devices to which a port downlink protocol packet is to be oriented, wherein the updating comprises: filling an access network address to be allocated in each port downlink protocol packet respectively into a blank item of the address information table, and marking the address occupation information as standby;
wherein, the address information table updating module is further configured to update the address information table when receiving a network access command response sent by a switch, wherein the updating comprises: marking the address occupation information in an item corresponding to the novel network address of the switch as used; updating the device description information as the current switch; updating the device resource description information as the port information of the current switch and the novel network address information of an access network device connected to a port thereof;
wherein, the address information table updating module is further configured to update the address information table when receiving a network access command response sent by a terminal, wherein the updating comprises: marking the address occupation information in an item corresponding to a novel network address of the terminal as used; updating the device description information as the current terminal; updating the device resource description information as the port information of the current terminal and a novel network address of an access network device connected to a port thereof.

8. The communication system of claim 7, wherein:
if the data packet is an uplink data packet, the first network interface will be a downlink network interface, and the second network interface will be an uplink network interface.

9. The communication system of claim 7, wherein the switching engine is further configured to: determine whether the following two conditions are met:
1) the port send buffer on the second network interface is not full;
2) the count of a packet counter in the packet buffer queue of the corresponding stream is larger than 0;
when the two conditions are met, sequentially read a data packet from the packet buffer queue of the stream corresponding to the stream identifier in the sending token, and put the data packet into a port send buffer on the second network interface.

10. The communication system of claim 7, wherein:
the first network interface is further configured to receive a service request protocol packet;
the packet checking module is further configured to: check the destination address, source address, data packet type and packet length of the service request protocol packet, and if the data packet meets a check requirement, put the data packet into a corresponding port receive buffer on the first network interface;
the switching engine is further configured to: read a service request protocol packet from a port receive buffer on the first network interface and put the service request protocol packet into a corresponding packet buffer queue, and poll the packet buffer queue, if the port send buffer on the second network interface is not full and the count of a packet counter in the packet buffer queue is larger than 0, sequentially read a service request protocol packet from the packet buffer queue at a predefined time interval and put the service request protocol packet into a port send buffer on the second network interface; and
the second network interface is further configured to: read a service request protocol packet from the port send buffer and send the service request protocol packet.

* * * * *